United States Patent [19]

Rogers et al.

[11] 4,055,753
[45] Oct. 25, 1977

[54] COMPUTING WEIGHING SCALE

[75] Inventors: Robert M. Rogers, Troy; Edwin E. Boshinski, Englewood, both of Ohio

[73] Assignee: Hobart Corporation, Troy, Ohio

[21] Appl. No.: 641,139

[22] Filed: Dec. 15, 1975

[51] Int. Cl.$^2$ .................... G01G 23/22; G06F 9/16
[52] U.S. Cl. .................................. 364/466; 177/6; 177/25
[58] Field of Search ............. 235/151.33; 177/1–6, 177/25, 177, 165, DIG. 1, DIG. 3; 109/10; 340/334, 336, 337; 58/50 R

[56] References Cited

U.S. PATENT DOCUMENTS

| | | | |
|---|---|---|---|
| 3,692,988 | 9/1972 | Dlugos et al. | 235/151.33 |
| 3,716,706 | 2/1973 | Gray | 235/151.33 |
| 3,725,656 | 4/1973 | Fukuma | 235/151.33 |
| 3,851,720 | 12/1974 | Williams, Jr. | 177/3 |
| 3,861,479 | 1/1975 | Pryor | 177/25 |
| 3,869,005 | 3/1975 | Williams, Jr. et al. | 177/25 |
| 3,916,173 | 10/1975 | Williams, Jr. et al. | 235/151.33 |
| 3,937,287 | 2/1976 | Pryor et al. | 177/25 |
| 3,951,221 | 4/1976 | Rock | 177/1 |
| 3,962,569 | 6/1976 | Loshbough et al. | 235/151.33 |
| 3,962,570 | 6/1976 | Loshbough et al. | 235/151.33 |

*Primary Examiner*—Edward J. Wise
*Attorney, Agent, or Firm*—Biebel, French & Nauman

[57] ABSTRACT

A computing weighing scale is disclosed wherein a single multi-digit numerical indicator is driven in real time by the scale microcomputer to display, sequentially, weight of the article, price per unit weight, and total price or value of the article. The indicators are part of a display which also includes function words identifying the nature of the information to the scale operator and customer. The scale also includes weight code generating mechanism, a keyboard for entering numerical information, and the microcomputer.

The single multi-digit indicator can also display tare weight, which is entered via the keyboard when there is no weight on the platter. If tare is entered and subsequent weight on the platter is less than entered tare, the calculating function is inhibited. If platter motion is detected with weight on the platter, the display will reset to the weight indicating condition and then sequence to show again price per unit weight (if entered) and total price. When all weight is removed from the platter, entered tare is erased, tare is, however, remembered during weight changes above zero weight.

Price per unit weight can be entered via the keyboard only when there is some minimum weight on the platter and is remembered for possible recalculation if weight on the platter is changed but not removed, price per unit weight is cancelled when all weight is removed from the platter.

Keyboard switches are interrogated a plurality times before entered information is accepted, to assure the key entry is valid and switch contact bounce has terminated. The platter motion detector is disabled for a short time after a key actuation, to avoid system resetting as a result of platter movement which may be induced by keyboard actuation.

The microcomputer scans the possible inputs from the scale and the keyboard, and sends output signal to the display, at real time rates which are compatible both with human keyboard manipulation and retention.

Scale operation is divided into two portions which are called the communicate and compute cycles; the communicate cycle is usually repeated many times between compute cycles in order that real time information sensing and display operation be possible.

50 Claims, 18 Drawing Figures

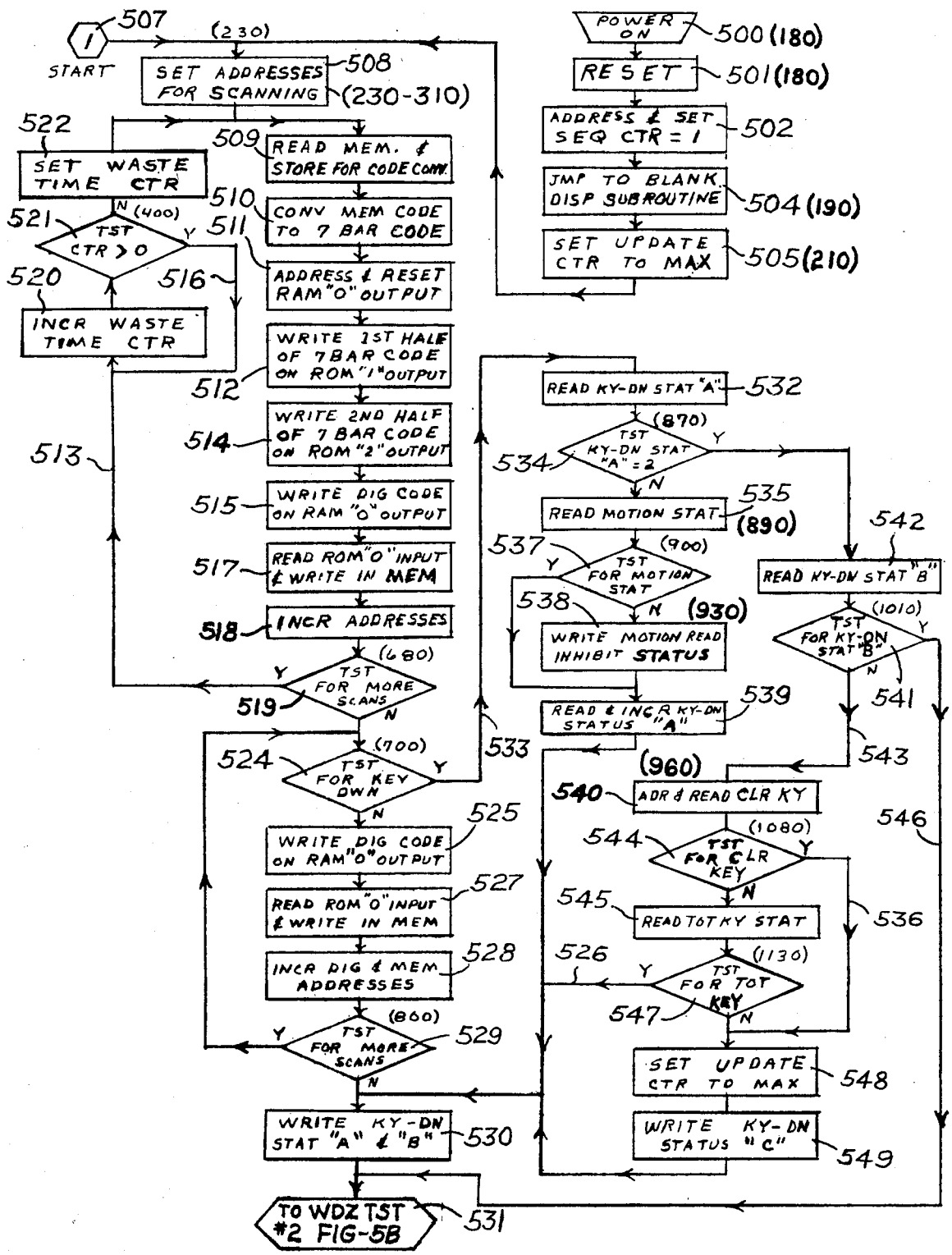

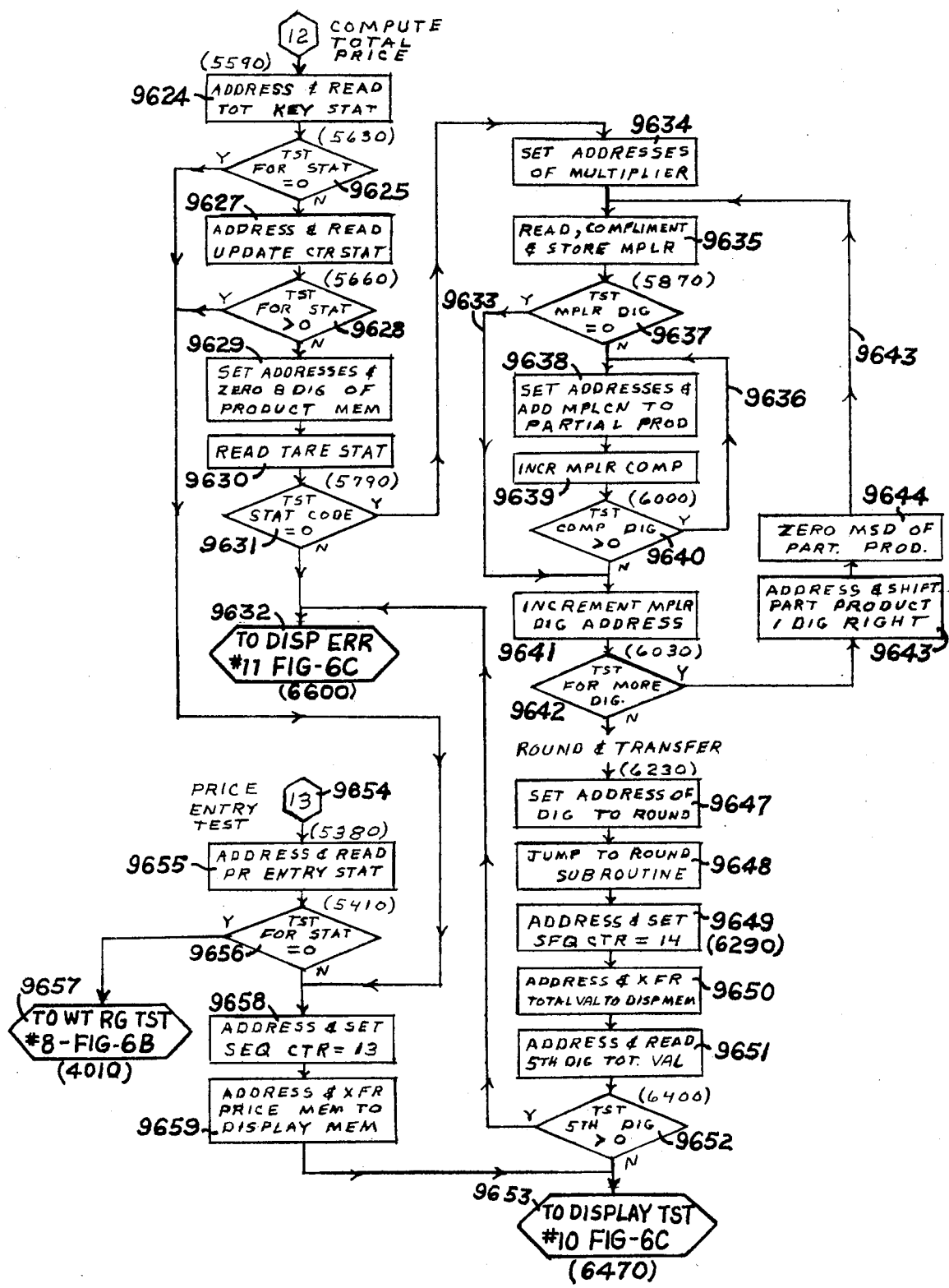

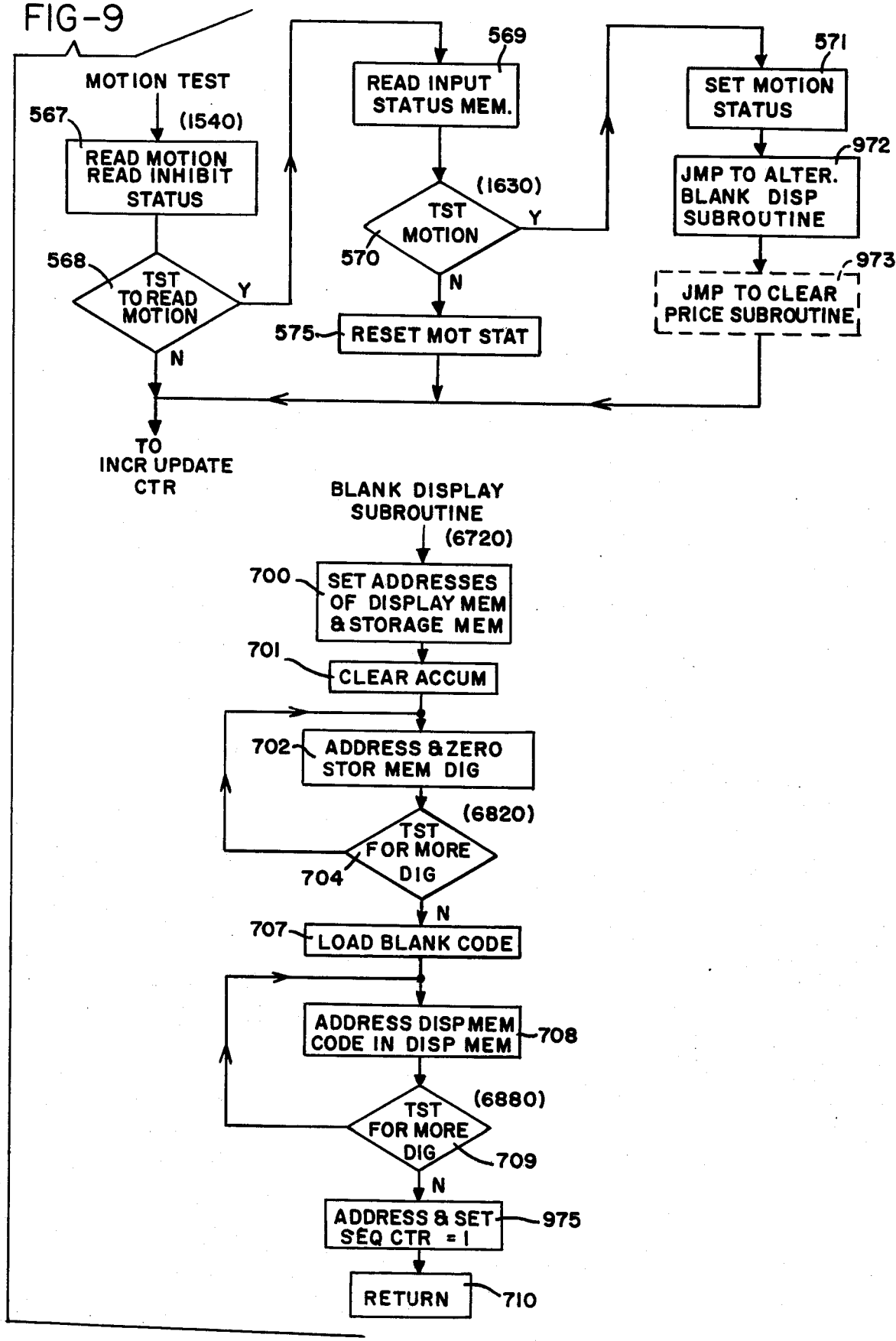

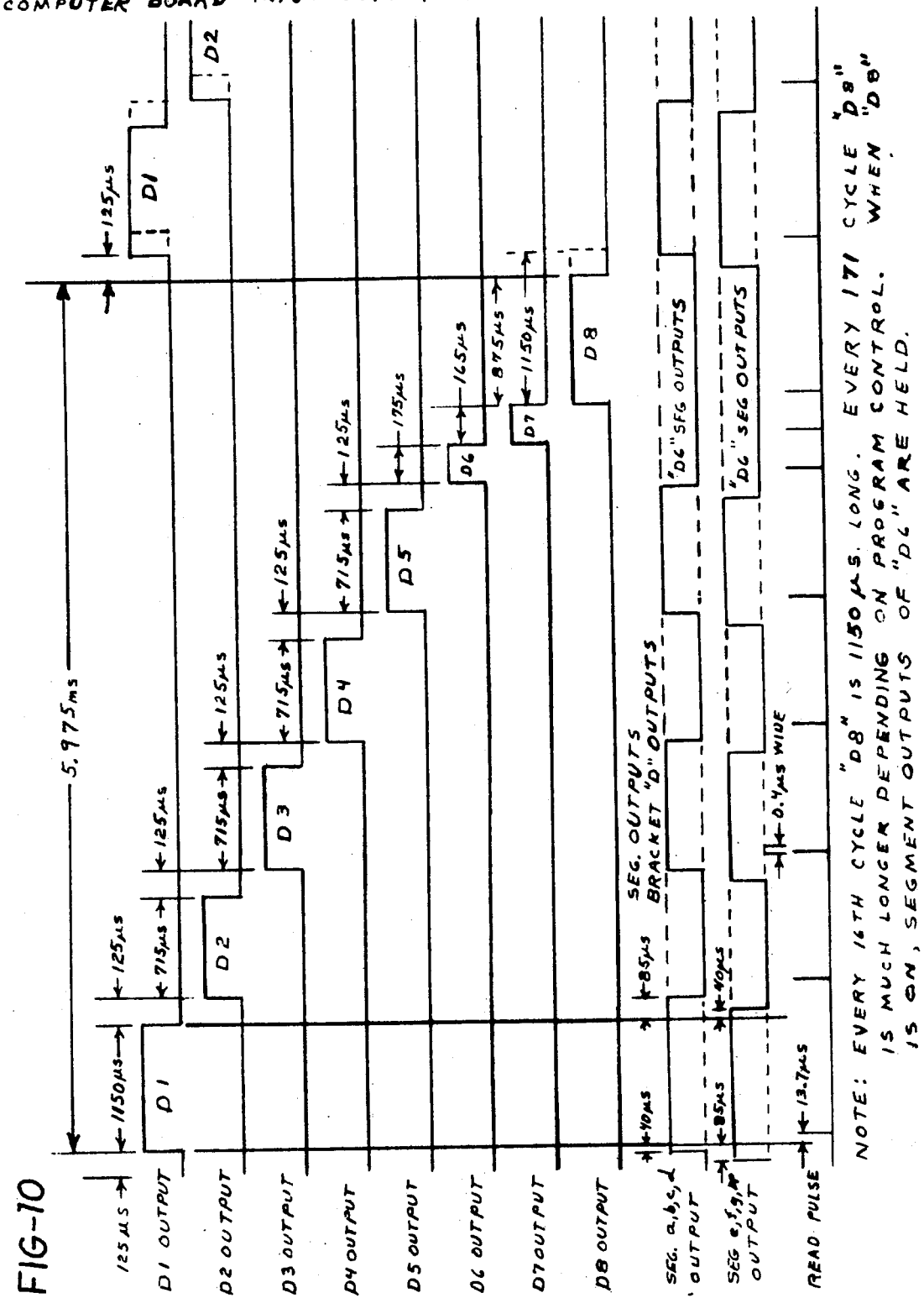

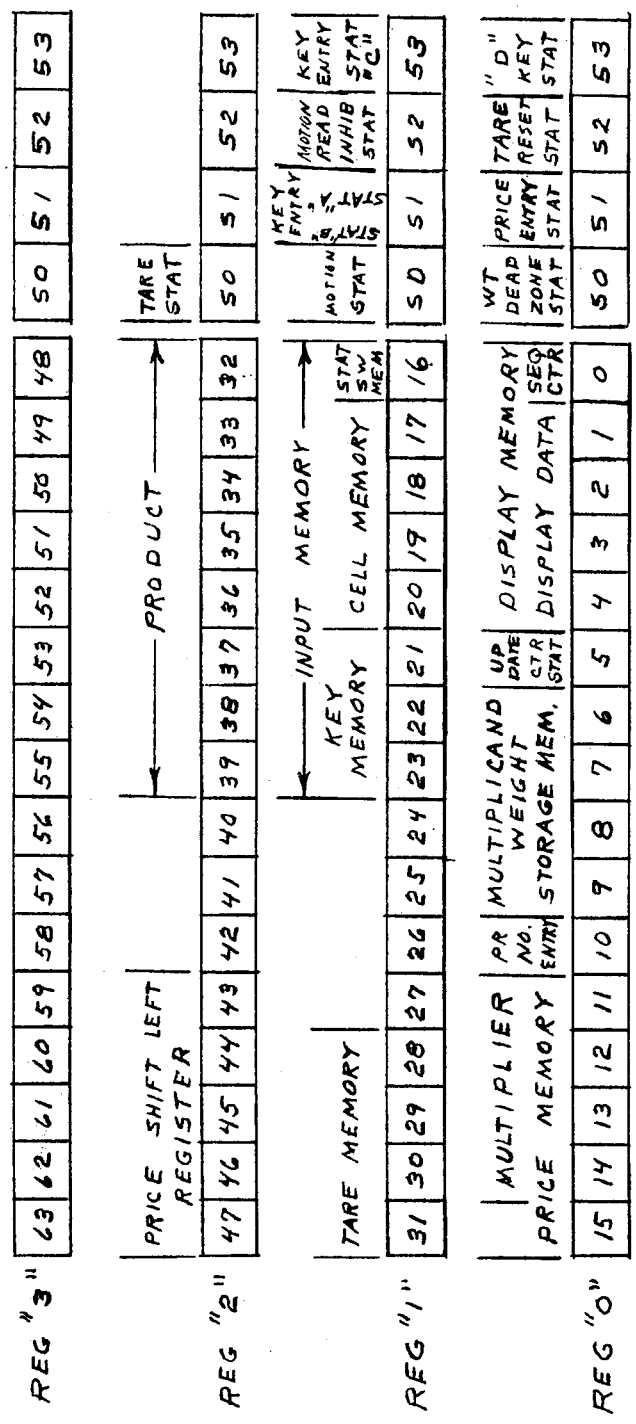
FIG-11  PROGRAM MEMORY ASSIGNMENTS

COMPUTING WEIGHING SCALE

RELATED APPLICATION

This application is related to copending U.S. application Ser. No. 641,140 entitled "Computing Weighing Scale," also filed Dec. 15, 1975, in the names of Edwin E. Boshinski Robert C. Meckstroth and Robert M. Rogers and assigned to the same assignee as this application.

BACKGROUND OF THE INVENTION

This invention relates to computing weighing scales, particularly scales of the type used in grocery stores, delicatessens, etc., to weigh random weight items, and to calculate the total price or total value of such items, based upon predetermined price per unit weight for the particular type of article or commodity. A typical form of prior art scale is disclosed in U.S. Pat. No. 3,741,324 of June 26, 1973 which has separate electronic digital indicators for price per unit weight and total price, and an optical weight display. A later version of that scale, known commercially as the Hobart Model 1500 Electronic Checkstand Scale, utilizes the same platter, weighing mechanism including weight readout and code generating mechanism, and includes provisions for transmitting weight data (on command) to a remote computer and optionally to a remote digital electronic weight display. That display, visible to the operator and the customer, shows only the weight of the item. A multistation version of this scale, utilizing a common computer system and individual displays for weight, price per unit weight and total price is disclosed in U.S. Pat. No. 3,906,208 issued Sept. 16, 1975.

For many years the so called "computing scales" of the drum computer type have been used in various types of food markets, etc. These incorporate a mechanical computing mechanism in the form of a moving chart, usually a rotating cylinder as typically shown in U.S. Pat. Nos. 2,742,811 and 2,880,643, and have a number of different columns related to corresponding price per unit weight. In these scales an indicator tape or wire is visually aligned along the chart by the operator, when the scale comes to rest, to read from the chart the weight of an article on the scale, and from the appropriate column total price or value. The operator then manually writes some or all of this information, in many cases just the total price, on the package used to wrap or cover the weighed item. In these scales the full chart is often visible only to the operator, and the customer sees only a weight display, and that from a vantage point where accurate alignment may be difficult. The computation capability in these prior art scales is of course limited by the number of chart columns. Such scales are not readily connected even to small in store computers, and they are essentially an independent weighing device.

In order to simplify and conserve the cost of readout devices for electronic computing scales, it is desirable to utilize a minimum number of more or less conventional components, without sacrificing the capability for accurate weight readout, simplification of data entry, safeguarding against operator error (unintentional or otherwise), and display clearing of data for both the customer and the operator.

The broad concept of multi-purpose seven-segment numerical displays (or equivalent) which are utilized in the scale of the present invention, together with identification of the data being displayed, is disclosed in U.S. Pat. No. 3,580,421 which relates to liquid dispensing, e.g., a gasoline pump. In this gasoline pump application of multi purpose numerical displays there is infrequent change of the price per unit factor (cents/gal.), and thus no need for quick entry or quick change of this information. There is also in the gasoline pump no requirement to recognize the end of the quantity measurement (gallons) since there is no problem of sensing when the quality is fully dispensed; the tank is either full, or a predetermined quantity has been pumped. In a similar manner, in the gasoline pump entry of the unit price factor precedes dispensing of a random quantity and computation proceeds as liquid is dispensed. Moreover, in the gasoline pump none of the dispensed material will be removed, so the quantity measurement is always unidirectional, and not subject to either plus or minus variations as when a customer wants some of a commodity taken from a scale platter weight is displayed.

In computing weighing scales, especially scales used in random weight measurement and total price calculation of many different items, the price per unit weight will frequently change, and the quantity (weight) may be changed up or down when the operator or customer, observes the actual displayed weight and before total price computation occurs, and it may also be necessary to adjust for tare weight of a package. In computing scales, moreover, the "weights and measures" regulations of various governmental bodies require compliance, and the competitive nature of the scale business makes cost a significant factor. Thus, the adaptation of a single multi-purpose multi-digit indicator to a computing scale presents unique and unobvious requirements.

SUMMARY OF THE INVENTION

The present invention provides improvements in a single multi-digit numerical display, such as a four digit, seven-segment LED or equivalent display, together with special function indicators such as selectively illuminated signs, to present article weight, price per unit weight, and total price in sequence both to the operator and the customer. If weight on the scale is changed during keyboard entry or computation, the display reverts to weight, the price per unit weight is remembered if already entered, and the display sequence begins anew using the new weight when the platter comes to rest. The number of illuminated indicator signs is minimized by careful choice of wording and/or symbology. Presently available mechanisms are used for weighing mechanism and scale motion detection, such as those disclosed in U.S. Pat. No. 3,741,324 and earlier U.S. patents referenced therein. The display unit may be mounted on or remote from the scale housing and may include front and back duplication of the multi-digit display and the indicator signs, if necessary for simultaneous viewing by operator and customer.

The keyboard for entry of price per unit weight in the present scale may be attached to or remote from the weighing scale housing. Preferably, the keyboard is at least a twelve key device having a "clear entry" function key by which the operator may cancel an erroneous entry, and a "total" function key to command display of total price. Tare may be entered only if the weight code output is below a predetermined minimum (e.g., "zero weight") and is displayed with a negative sign, which may blink to call attention. In such case, entry of price per unit weight is inhibited until the weight readout exceeds the minimum and the scale is at rest. Also, the display preferably is blanked during scale motion, to avoid possible confusion from display of changing weight, and the total price display is distinguished from the other displayed numbers, as by causing the displayed numerals to flash or modulate in intensity when total price is presented.

The entire operation is under the control of a microcomputer which interrogates the weight encoder and the keyboard, drives the display directly, in real time, and performs the necessary calculations of tare subtraction, and multiplication of weight times price per unit weight to arrive at total price.

The primary object of the invention is, therefore, to provide a novel computing scale which has a unique single unit multi-digit display that is arrayed to present, to the operator, in sequence, all or part of the quantities of commodity article weight, entered price per unit weight, and total price, and to repeat that sequence (if desired) if the weight is changed but not removed from the scale platter; to distinguish each number displayed in the sequence according to its purpose; to provide in such a scale appropriate indicator signs for distinguishing the numbers, using a minimum number of signs; to provide for digital entry of tare via the keyboard, only when there is no weight on the scale, and for keyboard entry of price per unit weight only when there is weight on the scale; to provide for clearance of incorrect keyboard entries in either mode; to provide for remembering entered tare and entered price per pound if weight on the scale is changed but not fully removed; and to provide a microcomputer which rapidly and repeatedly scans the keyboard and the weight encoder output signals and drives the display outputs, then follows alternate paths of a more complex program as necessary to determine weight, price per unit weight, and total price, when an item is placed on the scale platter and appropriate keyboard entries are made, utilizing a minimum of circuitry outside the microcomputer itself.

Other objects and advantages of the invention will be apparent from the following description, the accompanying drawings and the appended claims.

BRIEF DESCRIPTION OF THE DRAWINGS

FIG. 9 is a flow diagram of an alternate routine in portions of the program;

FIG. 10 is a timing chart; and

FIG. 11 is a chart of the RAM register assignments.

DESCRIPTION OF THE PREFERRED EMBODIMENT

Figure 1:
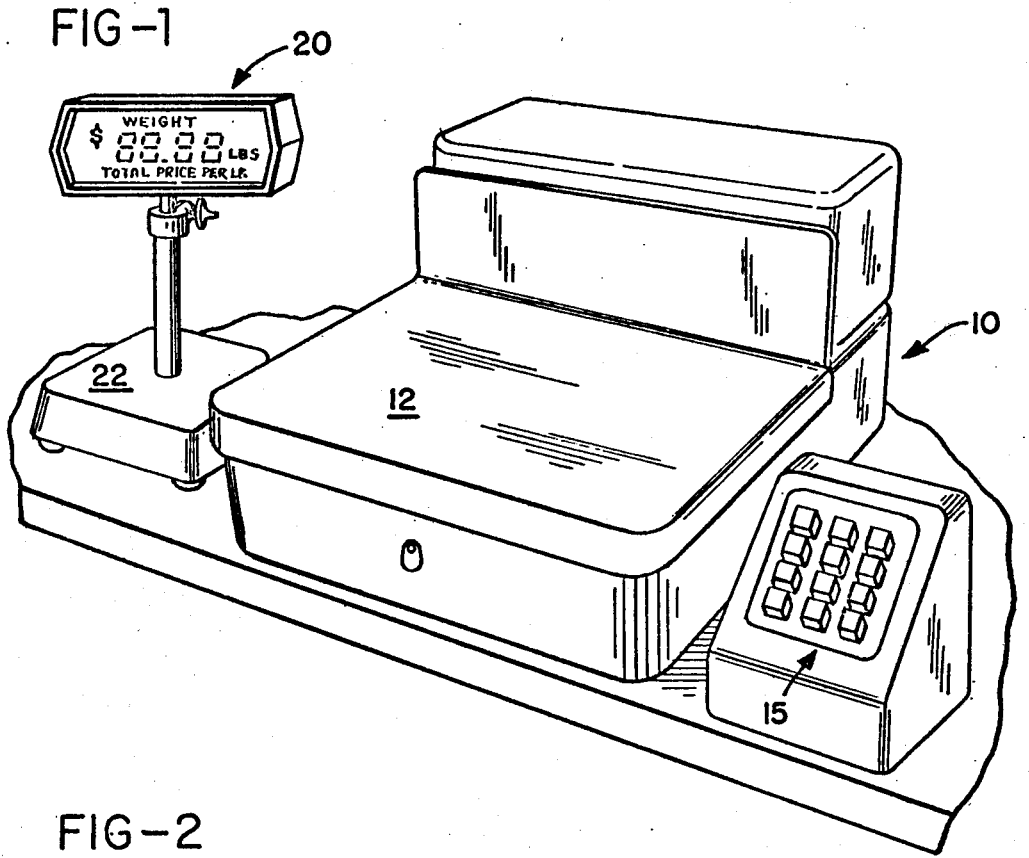
FIG. 1 is a perspective view of the new scale system, showing the housed weighing mechanism with electronics therein, together with a remotely connected display unit and keyboard.

FIG. 1 shows a weighing scale including a housing 10 on which a movable platform 12 is supported by suitable mechanism (not shown) to receive random weight articles. Platform motion resulting from weight of an article causes operation of a weight encoder 14 (FIG. 4A) to generate a coded weight information signal, as shown, for example in U.S. Pat. No. 3,741,324 and earlier patents referenced therein. If desired for convenience, the housing 10 can be mounted with platform 12 approximately level with adjacent countertop surfaces, and the platform may have a lock out device to protect the weighing mechanism when not in use.

Figure 3:
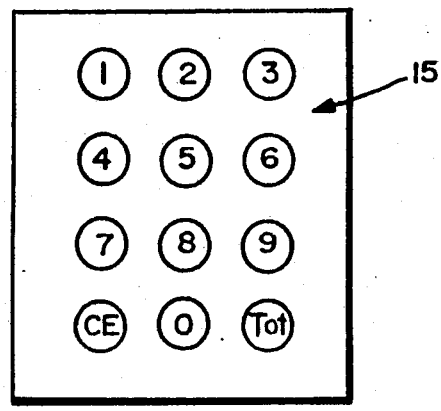
FIG. 3 is a diagram of keyboard layout.

A keyboard 15 is connected to the electronics package within housing 10 by a suitable cable. If the keyboard is to be supported remote from housing 10, as for operator convenience, the cable will be of appropriate length, otherwise keyboard is mounted to the side of housing 10. Any convenient keyboard layout can be used. By way of example, FIG. 3 shows a twelve key keyboard including keys for numbers 0–9 plus a clear entry (CE) key and a total (TOT) key. The functions of these keys are later described. Preferably, the keyboard contains only key buttons and related switches to complete appropriate entry signal circuits through a cable to the electronics package.

Figure 4A:
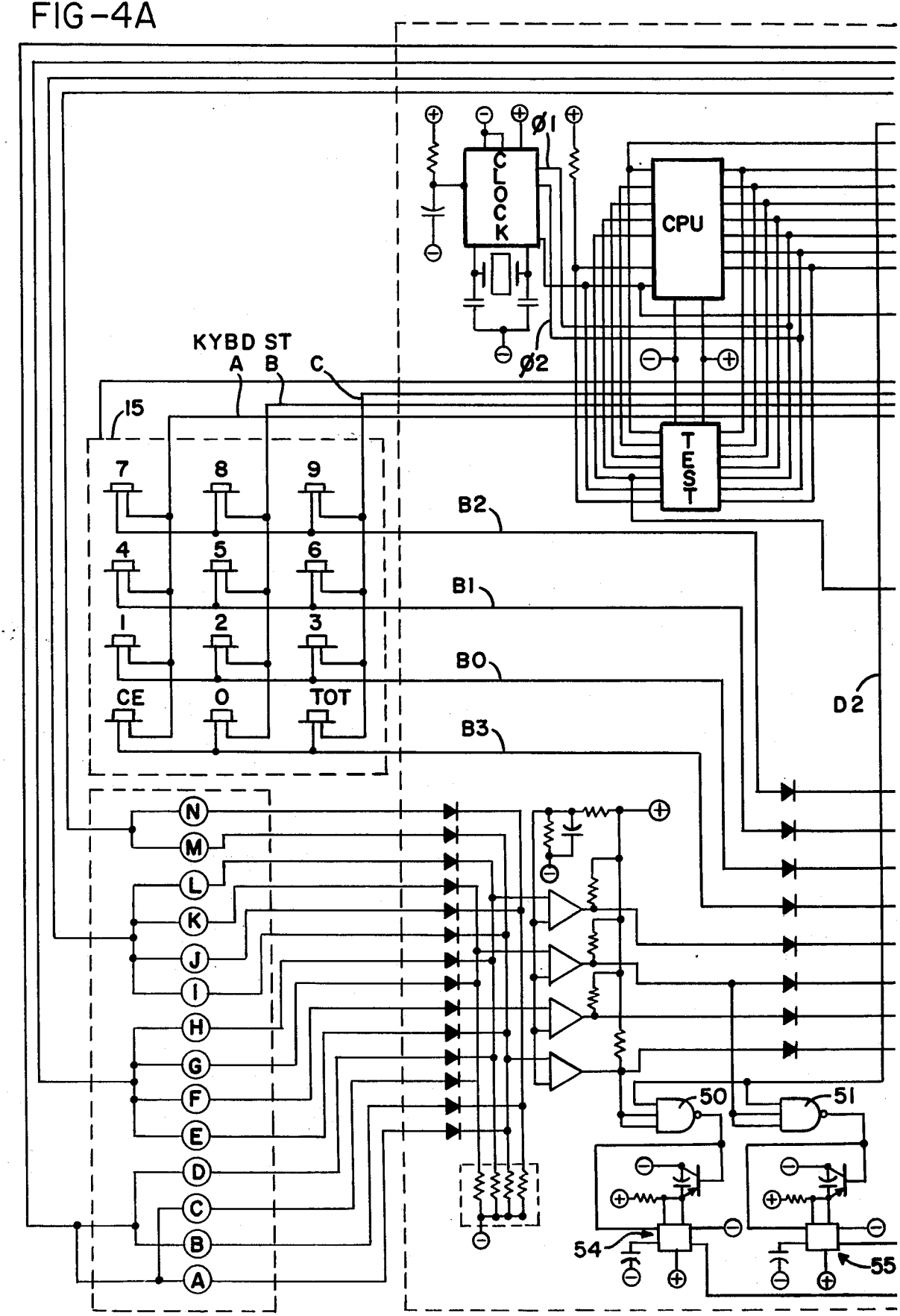
FIG. 4 (A, B & C) is an electrical schematic diagram of the system.

FIGS. 4A, B and C comprise a schematic diagram of a scale system embodying a commercially available microprocessor known as MCS-4 Microcomputer Set, available from Intel Corporation, Santa Clara, California. This microprocessor consists of a number of large scale integrated circuit chips, including a central processor (CPU) which contains the control unit and arithmetic unit, a random access memory (RAM), a shift register (SR), and one or more read only memories (ROM). A detailed description of such microprocessor is contained in a publication entitled *MCS- 4 Micro Computer Set Users Manual,* copyright by Intel Corporation 1974, including individual block diagrams for the CPU, ROM, RAM and SR. Further description appears in U.S. Pat. Nos. 3,753,011 nd 3,821,715 issued to Intel Corporation.

A display unit 20 is supported on a stand 22 and connected through an appropriate cable to the electronics package. The display unit comprises four seven-segment numerical displays 25-28 and a decimal point display 29, which may be a part of the display 26. In an actual embodiment the LEDS used for this purpose, are supported in a dark contrasting background plate 30. The negative sign display 31 is derived from LED unit 28.

The display unit also includes a number of selectively illuminated indicators, which may conveniently be individually back lighted translucent signs mounted on plate 30. They can be provided in distinguishing colors if desired, and each light source may be a relatively low power incandescent lamp. The signs shown are related to U.S. currency, and weight measure, and the English language, but can easily be changed to other language words or symbols, and metric or other measurement systems.

The signs in the display unit 20 are, (1) weight indication 32 and 33, (2) currency 35, (3) per pound 36, (4) total 37, and (5) price sign 38 energized with sign 36 or sign 37. The driver circuits, lamps, etc., associated with the display elements are shown in FIG. 4C and are of conventional design. The displays and signs may be duplicated on a reverse face of the unit 20 for view by a customer in instances where he would be on the opposite side of the scale from the operator.

In a typical weighing operation, the scale of FIG. 1 performs as follows. A random weight article, such as slices of cheese or one or more pieces of meat, is to be weighed. If the article is to be placed in a boat or other package device of known weight, that weight is first entered on keyboard 15, and tare weight is displayed with indicators 31 and 32 illuminated. If for some reason the weight encoder indicates more than a predetermined weight such as 0.02 lbs the tare weight entry is inhibited. In the present description including the program listing this 0.02 lb value is named the weight dead zone limit or, more simply, the weight dead zone (WDZ). It should be recognized that the name price reject zone might be more appropriate for weight values located within this zone according to the use made of these weight values in the present scale. It should also be recognized that this weight dead zone is distinguished from the weight forbidden zone wherein weighing is not permitted by certain common market European countries for scale accuracy and tolerance reasons.

If the operator enters a tare number via keyboard 15, that number appears on display 20 and the negative sign 31 illuminates and blinks to indicate that the displayed information is tare weight, i.e., a weight quantity to be subtracted from the gross weight of the article and its package to obtain "net" weight.

The display will continue indicating tare weight until the operator places the article on the platter 12. The display is then blanked until scale motion stops, then the number on the display changes to the amount obtained by subtracting tare weight from the gross weight. Thus unblanking of the display indicates termination of scale motion. The display will continue indicating that number, i.e., net weight, until the operator commences a second keyboard entry with the scale away from zero weight or the "weight dead zone" (WDZ). The numbers entered during this second keyboard entry are the price per unit weight and will be indicated on the numeric display, together with the words "price" (sign 38), and "per pound" (sign 36) and "$" (sign 35). If the operator enters price per unit weight quickly, before or just as the scale comes to rest, the net weight display will be maintained for a predetermined interval, then the display will sequence to the entered number.

The price per unit weight display will continue until the operator presses the total button TOT on keyboard 15, at which time the display will indicate the total price or value number computed by multiplying the net weight and the price per unit weight. Along with the total value number, the words "total" (sign 37) and "price" (sign 38), and "$" (sign 35) will also be illuminated. While displaying the total price quantity, the entire display including the numeric portion and the words will flash calling attention to the fact that total price is being indicated. The terms "total price" and "value" are used interchangeably (synonymously) in the specification, claims and drawings.

The indication of total value will continue indefinitely so long as the operator does not move the scale platter or strike the clear key, CE, on keyboard 15. When the scale platter is disturbed by some significant amount the display 20 will return to its weight indicating mode wherein a numeric weight value will be displayed with appropriate signs. If the platter disturbance did not cause the weight encoder to move below the weight dead zone upper limit, normally the previously described 0.02 pounds, two options can be followed. The display can remain on weight until another keyboard entry is made to reinitiate the computing operation, in which instance the previously entered price per unit weight is not remembered. Or, the display can continue indicating weight for a predetermined time, then commence indicating the previously entered price per unit weight, then after another predetermined interval, indicate a new total price, the appropriate words, weight, total, price and price per pound being illuminated as required.

If the platter disturbance was sufficient to move the scale chart to a weight indication below the weight dead zone upper limit, i.e., below 0.02 pounds, the price per unit weight entry previously made is erased and the scale remains in the weight mode until the operator intervenes with a new keyboard entry.

If the operator adds or removes a very small amount of weight to the platter, an amount insufficient to actuate the scale motion detecting device, the display does not return to the weight indicating mode, but does indicate a new total amount quantity computed from the new net weight, that is, the indicated total value is merely updated in accordance with the weight now on the platter.

If, the article placed on the platter weighs less than a entered tare weight, a negative value of weight results, this condition is indicated by displaying a negative weight value. If computation should be attempted with this negative weight the four center segments 31, etc., of the display 20 are illuminated together with the words "$", sign 35, "per pound" (sign 36), and "price" (sign 38) to indicate that entry into the total value mode cannot occur with a negative weight value. If weight placed on the platter exceeds the capacity of the scale, or if the scale indicates a weight value below zero pounds, the four center bar segments of the display 20 are illuminated together with sign 32, to indicate an improper weight and entered price per unit weight provides a total value quantity which exceeds the display capacity (99.99 as shown), the center bar segments of the numeric indicators together with signs 37 and 38 are illuminated, indicating a total value which exceeds display capability. These error indicating actions of the display are especially useful in scale servicing.

The clear key CE on keyboard 15 is provided with the ability to erase a tare entry, a price per unit weight entry, and also the currently displayed total price, when depressed. Use of the clear key with weight on the platter returns the scale to weight mode from either unit price or total price modes. Depressing the clear key when the scale is within the weight dead zone will clear entered tare.

The total button TOT is used primarily to forward the scale from the price per unit weight mode to the total value mode. However, the total button is also used to disable the keyboard from further use (except for the clear key) while unchanged weight remains on the scale. Actuation of the total button is ignored prior to the scale being in the price per unit weight entry mode, and also if no price per unit weight entry has been made. As indicated previously, a disturbance of the scale platter 12 after a total button entry has been made, can initiate an automatic sequence of weight, price per unit weight and total value display.

Removing the article from the scale causes the weight encoder to return to "zero", e.g., under 0.02 pounds, and this in turn resets the microcomputer and display unit to weight mode. Tare previously entered is not remembered upon return to zero weight, provided a computation has been completed; however, it is remembered if the interim reset to weight mode is encountered during a weighing operation.

ELECTRICAL LAYOUT

FIGS. 4A, B and C comprise an electrical schematic diagram for the microcomputer circuits, keyboard, photocell readout of the scale weight chart, and the display circuit boards which include the four seven-segment numerical displays and the various signs.

The basic microprocessor units include the crystal controlled clock which provides $\phi 1$ and $\phi 2$ clock outputs, the central processing unit CPU, the Random Access Memory, RAM, and a read only memory, ROM. In the illustrated embodiment the ROM consists of three electrically programmable and eraseable memory devices (Intel type 4702A) which are conventionally known as PROM, together with an interface circuit (Intel type 4289) and two latch circuits 4024A (a CMOS circuit available from several manufacturers) which together comprise the equivalent of a mask programmable ROM, such as Intel type 4001. It should be understood that in a mask programmable version, the interface circuits and the latch circuits are incorporated within the large scale integrated circuit of the ROM.

The keyboard 15 corresponds to the keyboard illustrated pictorially in FIG. 1, and the various keys are correspondingly labelled. The keyboard is interrogated sequentially in three steps which are indicated by the three input lines labelled KYBD. ST. A, B and C, which are abbreviations for keyboard strobe A, B and C. These lead selectively to the three vertical rows of key switches from left to right, respectively, as shown in FIG. 4A. The other sides of the keyswitch contacts are connected horizontally to four keyboard output lines which are labelled, respectively, B0, B1, B2 and B3. It should be noted that the keyboard output line B3 includes outputs for the clear key CE and the total key TOT, as well as numerical 0.

The keyboard strobe A, B and C lines are strobed from a decimal decoder circuit (a C MOS 4428 circuit) in sequence, by signals 06, 07 and 08, respectively. Decoder signals D1 D5 drive a buffer circuit (CMOS 4049) which in turn has six sequential outputs leading to the decoding logic on the display control board.

The weight reading photocells A through N, correspond to similar photocells shown in U.S. Pat. No. 3,557,353 and cooperate with a chart (not shown here) to read a code corresponding to weight on the scale platter when the platter and scale mechanism come to rest, e.g., at no motion. Certain of the photocells, A and C, also cooperate with the chart to provide a motion detection device which indicates scale motion, as described in the aforementioned U.S. patent, and other photocells M and N, cooperate to provide an output indicative of the weight dead zone (WDZ) when weight on the platter is less than 0.02 pounds, for example.

A pair of gate circuits 50 and 51 each have one input from the strobe output line Q2 of the decimal decoder, and gate 50 also has an input from the preamplifier associated with photocell A, while gate 51 has an input from the preamplifier associated with photocell C. The outputs of gates 50 and 51 are connected to reset circuits for monostable pulse generators 54 and 55, and the outputs of the two monostable circuits are connected to inputs of gate 57 (FIG. 4B) along with an input from the decimal decoder strobe line Q1. When the chart is moving past the photocells, the preamplifier outputs are changing, and the monostable circuits are continually being reset, at which time the output of the monostable goes to a high condition and remains high until the term of the monostable pulse generator expires. Thus, if the output of either monostable generator is low at the time the motion detect circuits are stopped, this is an indication of no motion.

The decoding address circuits 60 and 61 are associated with the interface circuit and function to address appropriate ones of the PROMS and latches. These circuits may be CMOS MC 14556 CP, and again are utilized in connection with the electrically programmable PROM, but are internally incorporated in a mask programmable ROM.

Although the preferred embodiment of the invention is disclosed in terms of a microcomputer and its program, it is to be understood that a scale duplicating the performance of the present scale could be fabricated with conventional logic circuits by one skilled in the art.

PROGRAM

The microcomputer program used in the preferred embodiment of the present scale is listed in Table I (pages 76 to 91) of this application in a form which may be prepared from programmer's listing by an assembly routine available from Intel Corporation and accessible on the General Electric Company time share computer network. In Table I the first column of numbers containing three or four decimal digits between the values of 100 and 8100 identify line numbers in the program and are used for reference to program steps in this specification. The second column of numbers is comprised of twelve binary bits of information and represent the ROM address of each instruction in the program in binary form. The third column of numbers in Table I consists of eight bit binary words which identify the microcomputer instructions in binary machine language. These instructions correspond to the instruction set information listed on pages 16, 17 and the rear cover of the *Intel User's Manual.* The fourth column in Table I includes four alpha-numeric characters used to identify program sections or subroutines in this column the alpha-numeric characters generally relate to the function performed, that is, the letter "S" indicates scan, the letter "K" keyboard, etc. The fifth column of information in Table I identifies the instructions of column 3 in mnemonic symbols. Column 6 of Table I contains programmer's comments relating to the functions being performed.

Figure 5B:
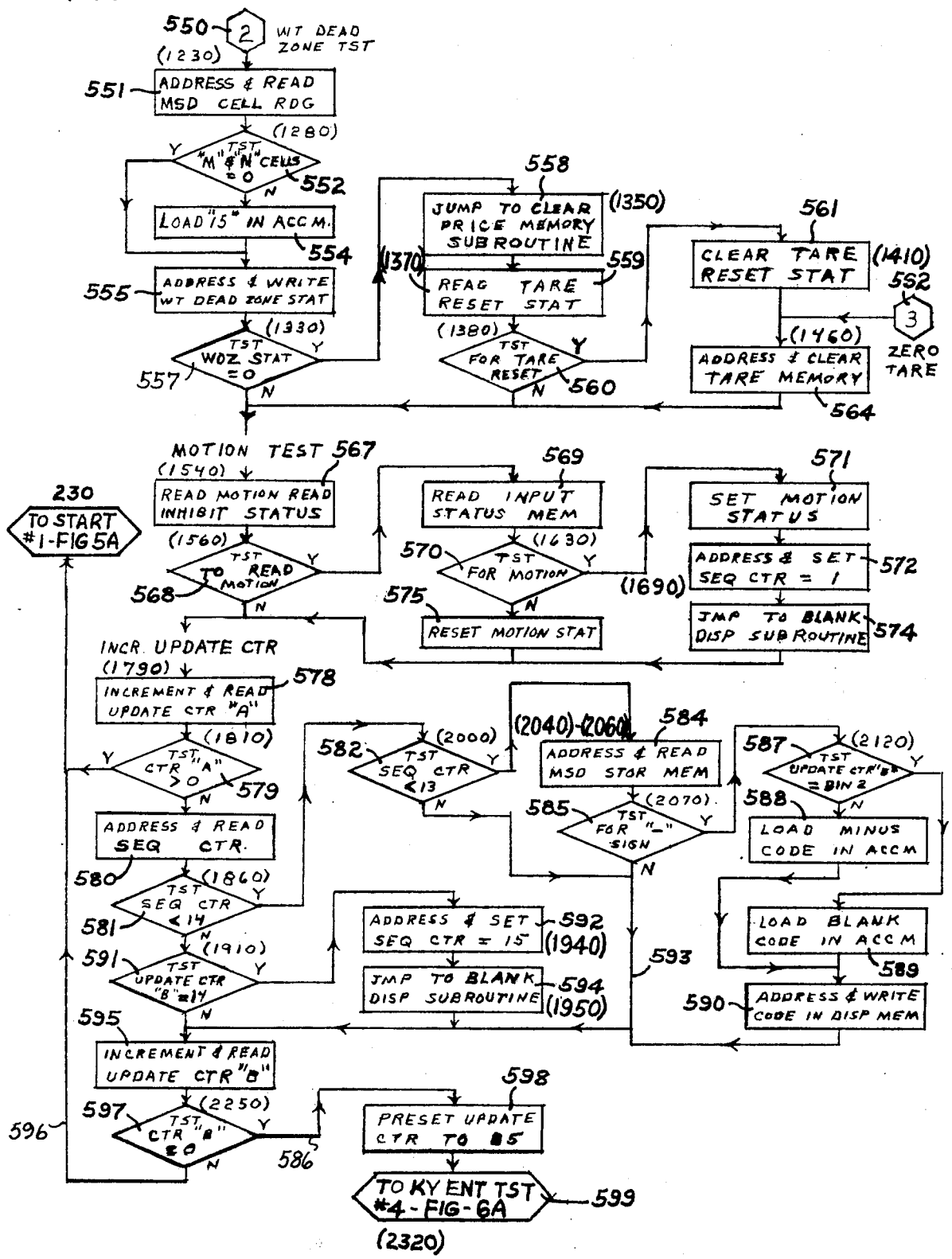
FIG. 5(A and B) is a flow diagram of the short loop communication portion of the program.
Figure 6A:
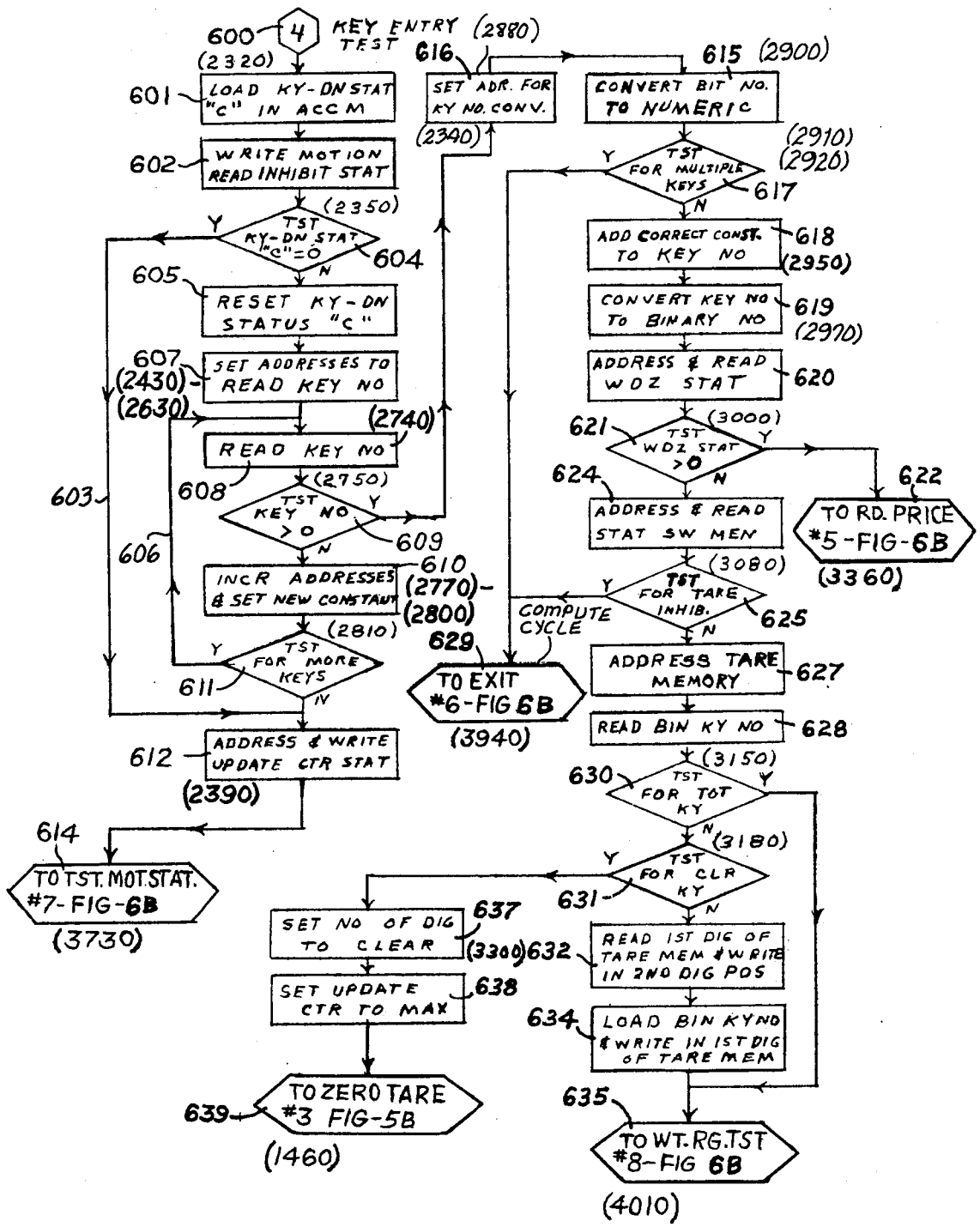
FIG. 6 (A, B, C and D) is a flow diagram of the computation sequence of the program.
Figure 6B:
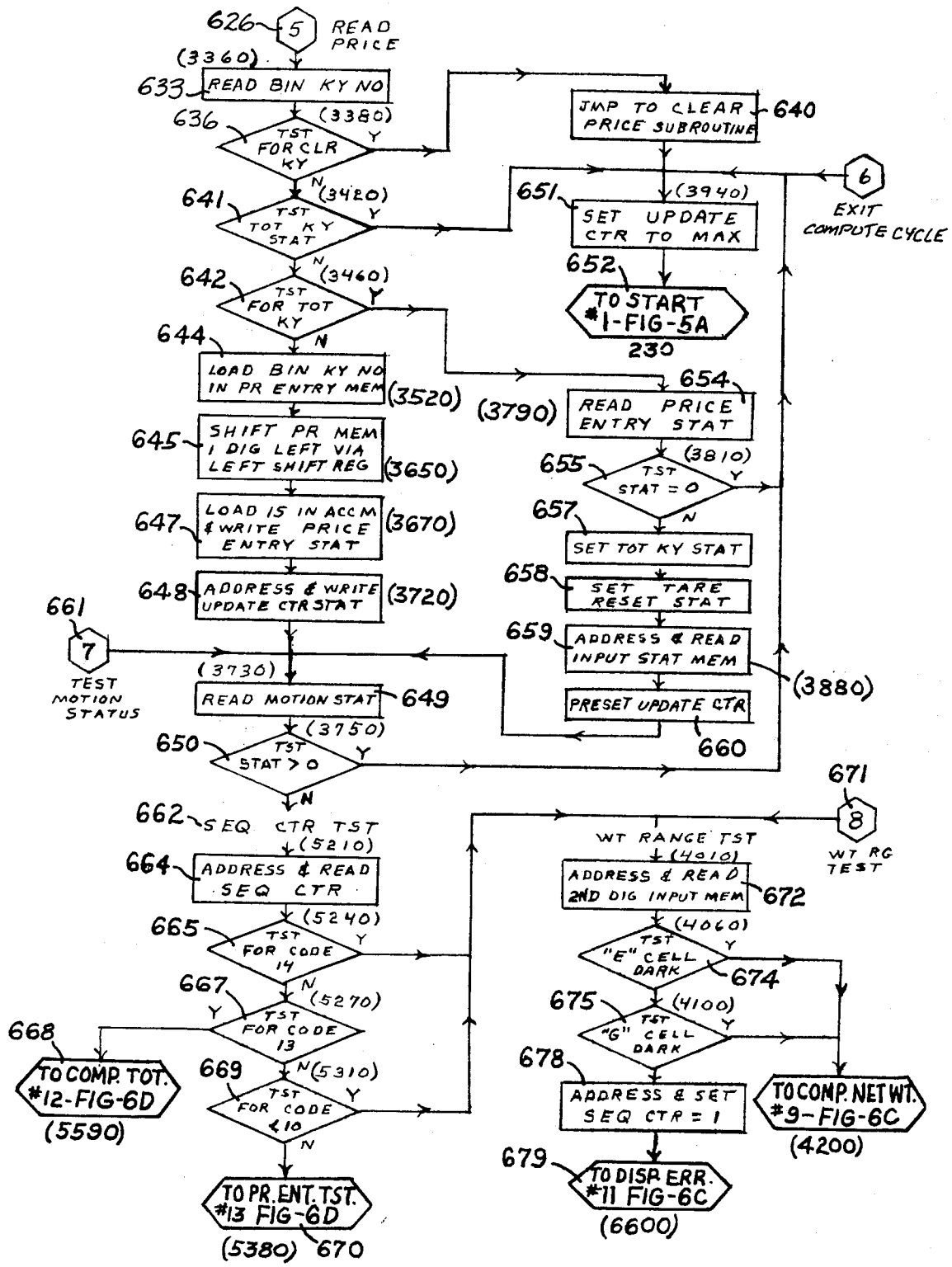
Figure 6C:
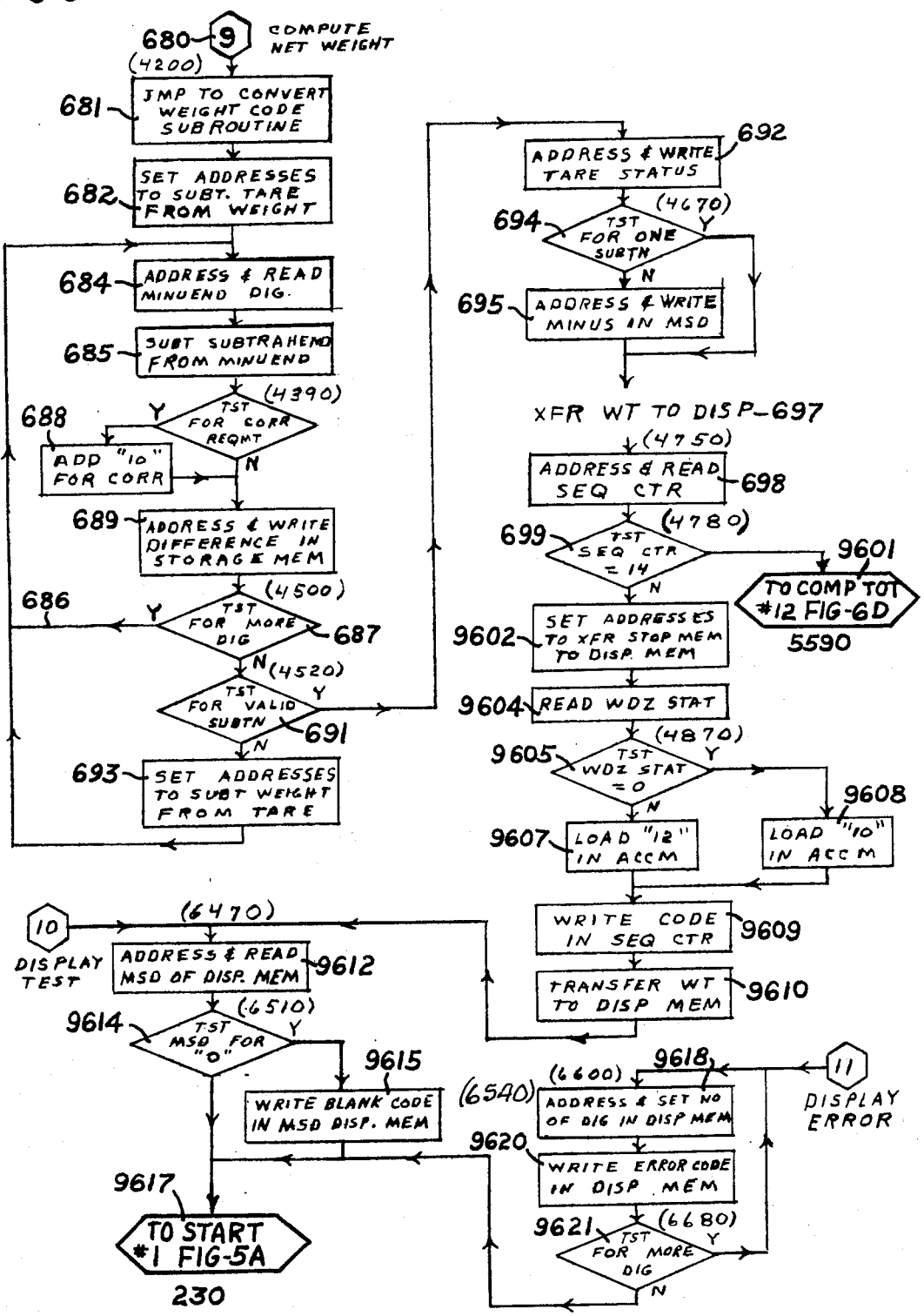
Figure 7A:
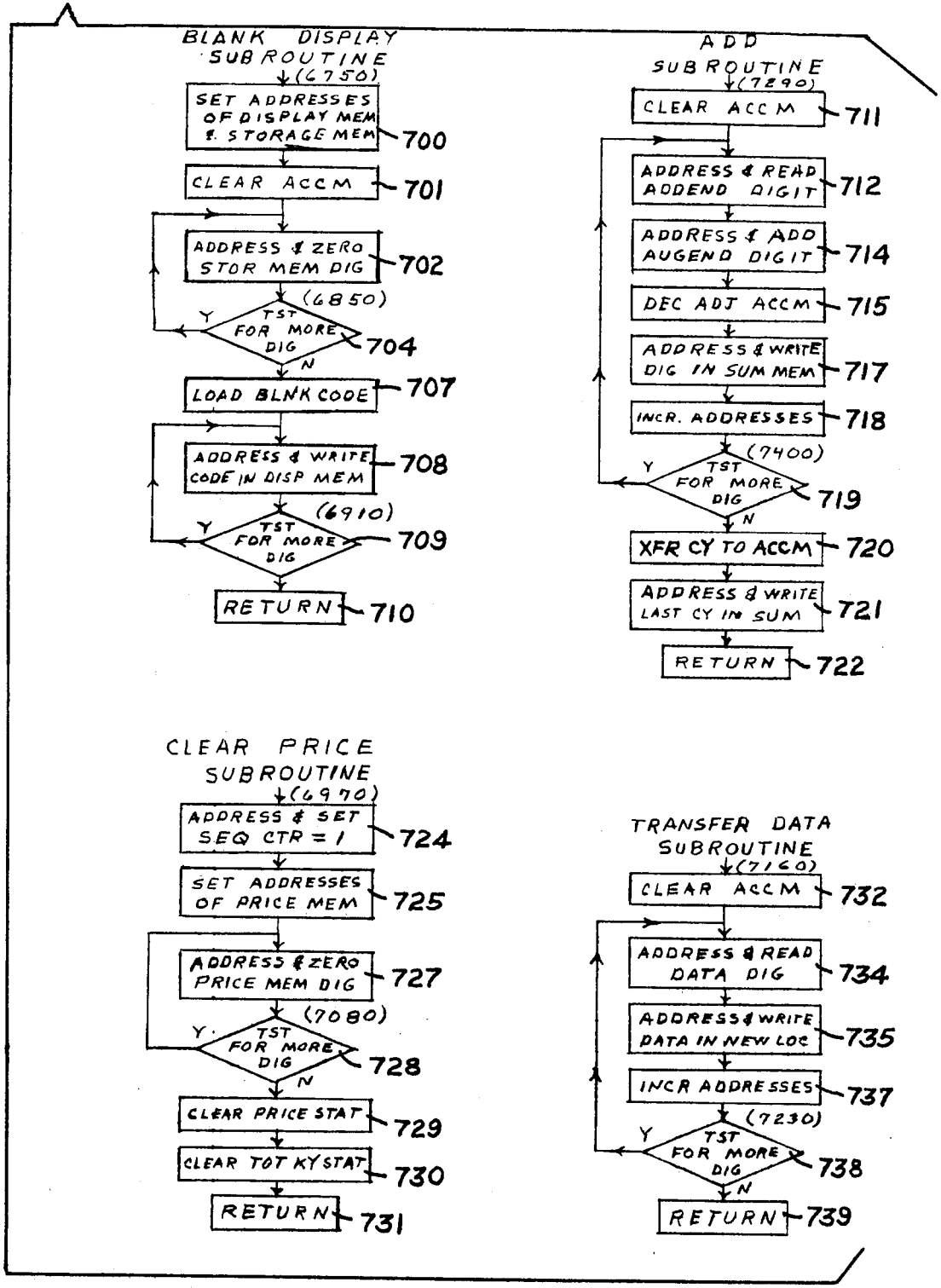
FIG. 7 (A and B) is a flow diagram of program subroutines.

FIGS. 5, 6 and 7 show the program in flow diagram form, in which blocks having rectangular shape, i.e., 501, 502, indicate processing steps, blocks having a diamond shape, i.e., 522, 519, 541, indicate decision instructions with affirmative or yes decisions indicated by paths leaving the block left or right side, and negative decisions by paths leaving the block bottom side, hexagon blocks 507, 562, etc., indicate input points from other sheets of the program flow diagram, and romboid shaped blocks, i.e., 531, 599 indicate exit points to other sheets. The flow diagrams are related to the program listing of Table I by the three and four digit numbers shown adjacent each decision and certain of the other blocks, i.e., the number 680 in parenthesis adjacent block 519 is the column 1 line number in Table I for the instruction(s) performing the indicated function.

As will be apparent from the following description in the present scale system, it is notable that all of the operations involved in collecting tare information, weighing articles inputing price per unit weight information and displaying numerical and function indicating quantities in the present scale are performed in real time using only the microcomputer registers and without the benefit of outboard or external storage elements. This scale arrangement is found to provide both a small physical size wherein all of the electronic and display components can be mounted on a single small printed circuit board, and a low manufacturing cost wherein the usual external registers for storing input and output information are eliminated.

According to this real time mode of scale operation, the microcomputer is connected frequently and briefly during a communicating cycle to each of the input and output transducers used in the scale, i.e., the keyboard, the weight indicating photocells, the motion detecting apparatus, the numeric display and the mode indicator lamps in the display, etc. These connections and their time duration are controlled by the microprocessor program, and are carefully selected so as to provide a clear and pleasing communication to the scale user.

In order that the scale of the present invention be simultaneously free of external storage elements, responsive to input signal changes and capable of indicating changes to an observer within the observer's response action time, it is desirable to perform the input and display operating steps frequently, or at least with some predetermined minimum frequency. For example, it has been found that in operating a keyboard it is impossible for an operator to close and release a key in less than about 20 milliseconds; in a similar manner, an observer does not distinguish a light which flickers at a rate above approximately thirty cycles per second from a continuous source. In the present scale, these physical characteristics of an operator are employed to permit a microcomputer having essentially one-function-at-one-time capability, nevertheless, to perform a plurality of operator related functions.

In order that operator-related functions including sensing new weight, sensing a keyboard entry, and updating the display be possible at human reaction speeds, the program is organized into two major portions. One portion is a first loop which communicates repeatedly, excites the displays, senses keyboard and weight inputs, performs a weight dead zone test and a motion test and then repeats. After performing these basic steps for a predetermined number of times, or upon receiving a data related command, the scale proceeds to a second or compute loop or operations wherein computation, data conversion and other time consuming events are performed.

The test for weight dead zone is included within the communicate loop in order that scale departure from the weight dead zone be recognized as quickly as possible. Also, the identification of keyboard information as a tare weight, or a price per unit weight factor, is determined by whether the scale is within the weight dead zone. The motion test is included within the communicate loop in order that an operator act involving significant change of scale platter weight be recognized as quickly as possible to blank and reset the display.

In the flow diagrams, the steps and paths added to the computer program for the compute cycle are shown in FIG. 6 including the blocks 600–9653. (Numbers in the 9000 series are used to distinguish from the 700 series of numbers in FIG. 7). Specific subroutine details are shown in FIG. 7, including blocks 700–754.

In the flow diagram of FIG. 5, the communicate cycle of the scale is shown in blocks 500–597, these blocks corresponding to the program steps between lines 100 and 2280, in Table I. This cycle may be repeated in normal scale operation a predetermined number of times, 171 times in the preferred embodiment, before entering the compute cycle. Each trip through the communicate cycle consumes approximately 5.9 milliseconds of operating time, as indicated in FIG. 10. This time is sufficiently short to insure the capture of operator altered keyboard or weight information by the microprocessor.

The communicate cycle of the scale commences with block 508, a point identified as line 230 in Table I. Prior to entering this cycle, the power on and resetting sequence of blocks 500 and 501 are performed with the resetting signal of block 501 being developed in the microprocessor clock. Following this initial reset, the sequence counter and update counter (see FIG. 11) which respectively determine the identity of the information being displayed, and the times the communicate cycle is performed, are set to initial conditions as shown in blocks 502 and 505. The update counter is set to a maximum value in these steps, so that a compute cycle is executed following the first communicate cycle sequence. The preliminary steps also include use of the blank subroutine at block 504 as a form of reset in preparation to reading zero weight as explained later.

Following the placing of addressing and counting constants in the appropriate RAM registers as indicated by block 508 in FIG. 5, the communicate cycle begins at the sequence of steps 509–518 which relate to timing the display 30, collecting weight information and keyboard status. In the arrangement of the present scale, signals developed by the steps 509–518 on the RAM data port lines D1–D8 in FIG. 4 are used as enable pulses to simultaneously collect information into the scale via the ROM 0 input port and send information from the ROM 1 and ROM 2 output ports to the display.

The signals emanating from the RAM zero output port are given the name "D" times, (D relating to digits) since during certain D times one of the numerical displays 25–28 is illuminated. The time relation and time duration of the D times is shown in FIG. 10. The assignment of D times to output codes emanating from the RAM zero data port is shown in column 4 of Table II. As indicated at this column 4 display digits 25, 26, 27 and 28 are illuminated, respectively, during times D2, D3, D4 and D5, these times being of equal length, approximately 715 microseconds (FIG. 10).

From Table II, column 4 and FIG. 10, it will also be noted that during D1 time the identity lamps, i.e., the lamps for the signs 32, 33, 35, 36, 37 and 38 on the display, are illuminated. D1 time is made longer than the D2 to D5 times in order that desirable brilliance be realized from the incandescent lamps used to illuminate the signs. The display numerals are preferably LEDS. As also indicated in column 4 of Table II, Ram 0 output codes other than BCD values 1, 2, 3 and 4 which are assigned to D1 to D4 times, are assigned for inputing keyboard information, i.e., RAM0 BCD codes of six, seven and eight, respectively.

It is to be noted in column 4 of Table II that the RAM 0 BCD codes of 1 through 5 enable both input and output functions in the scale, the BCD code 1 (D1 time), for example, providing an enable signal for both lighting the sign lamps and for accessing status switch information. The status switches are the performance selecting switches or jumpers 65 in FIG. 4B. RAM 0 BCD output code of 3, D3 time, as a further example, enables the second most significant digit of the display 30 and simultaneously the second most significant group of weight indicating photocells, cells E, F, G and H (FIG. 4A).

During each trip through the sequence of program steps represented by blocks 509–518 and the return through blocks 520–522, a different one of the RAM zero output code (D time signals) is generated. The D time signals actually appear upon performance of the block 515 step at the instruction of line 590 in the program of Table I. Incrementing of the index register of the CPU, to produce different D times, occurs at line 650 of Table I which is indicated at block 518 in FIG. 5. Details of the index registers, etc., are explained at pages 10-14 of the MCS-4 *User's Manual* identified above.

As indicated in FIG. 10, the D time intervals D1 through D5 are separated from each adjacent D time interval by a time of approximately 125 microseconds, this time being used to change the data sent to the display. As described, the starting of a D time signal is indicated at block 515 in FIG. 5, while the stopping of a D time signal occurs at block 511.

Since the intensity of light generated by both the numeric digit indicating devices 28, etc., and the word indicating signs depend upon the multiplex ratio of on-to-off times for a display element, it is desired that these elements be in the "on" condition for the largest possible percentage of the display operating time. Restating this proposition, it is desirable for each of the blocks D1, etc., in FIG. 10 to be as long as possible in order that the peak current needed to drive the display elements to a given luminous intensity be as small as possible. There is of course a trade-off between time and peak current in multiplexed incandescent and light-emitting diode-luminous sources.

In order to stretch the duration of each of the D1 through D5 times beyond the time needed for executing the related central processor instructions, a time wasting sequence (steps 520–522) is included in the return path 513 for D time generation. By means of this waste-time sequence, each of the pulses D1 through D5 generated in the block 509–518 sequence is lengthened. By way of the loop 516, the duration of the D1 time pulse is made longer than any of the subsequent D2 to D5 pulses, such that luminous intensity of the indicator signs 37, etc., which are illuminated by incandescent filament lamps appear similar to the intensity of the light emitting diode elements used in the numeric displays.

The decision of block 519 indicates that the D6 pulse of FIG. 10 has been developed by the block 509–518 sequence. At this time the sequence to steps 524–529 which develops the pulses D7 and D8 is commenced. The D7 to D8 pulses are employed for reading information from the scale keyboard and are made short in duration so that as much as possible of the available communicate cycle time be devoted to the display intensity controlling D1 through D5 times. As indicated in FIG. 10, the D7 and D8 times are not separated by the data set up time required between the other D time pulses; as also indicated in FIG. 10, the D8 time pulse is longer than either of the D6 or D7 pulses, the D8 pulse being turned "on" in the normal manner but allowed to remain "on" until reset during the next following cycle. The duration of the D8 pulse is therefore, determined by the time required to complete the communicate cycle steps following D time generation, i.e., the steps down to block 597 in FIG. 5.

On each trip through the sequence of steps 524–529 for generating the D7 and D8 timing pulses, the possibility that a key on the keyboard 15 in FIG. 1 has been closed by the operator is considered. Key closures in the present system are first discovered during communicate cycle operation and are stored temporarily as one bit of information in the twelve bit storage field at RAM location 21 to 23 (FIG. 11). This one of twelve key indication is decoded to a numeric value and tested for possible errors during compute cycle operation of the system when the time needed for a multistep decoding procedure can be afforded. Repetition of this decoding procedure in each communicate cycle would of course keep the microcomputer away from the display lighting steps for a larger percentage of that cycle operating time and reduce display intensity. The finding of a closed key at block 524, which corresponds with the JCN test of line 700 in Table I, provides access by the path 533 to the keyboard status sequence at steps 532–549. In the keyboard status sequence, status word A is used to determine when a key closure may be safely regarded as authentic information, such determination being made after three consecutive communicate cycles find the key closure to exist. A count of two in the keyboard "status A" word indicates three consecutive scans of a closed key have occurred. Status word A is incremented at block 539 each consecutive time the test of block 524 finds a key closure. If a key should bounce to the open condition after being once closed for a block 524 test, status word A is returned to the count of zero at block 530 and a new series of three successive scans can commence.

Once a key down status of two is sensed at block 534, the input memory key contents at RAM locations 21–23 (FIG. 11) is known to be valid and free of key bounce errors and therefore usable in the display or in computation. The keyboard information is actually read into the temporary storage RAM locations 21–23 at block 517 during D6, D7, and D8 times, respectively.

The presence of valid keyboard information in RAM input memory is signified by setting of a second keyboard status word, "status B" to preclude a second reading of the closed key. Keyboard status B is set at block 530 following a trip through the block 532–549 sequence wherein verified key data is found. On successive trips through the keyboard status loop commencing at block 532, the test of block 541 will activate the path 546. Once verification of the keyboard information has occurred at block 534 the path through block 542, along path 543 is used for communicate cycles until the steps of blocks 548 and 549 are reached and initiate a compute cycle to decode and store keyboard information. The key down status C of block 549 is sensed during a compute cycle to initiate keyboard data decoding. Once a compute cycle has accepted the keyboard information, a key down status B flag is set. Testing of this key down status B at blocks 542 and 541 precludes keyboard activity during subsequent communicate cycles until a no key closed condition occurs. During the cycles which occur while an already sensed key remains closed, the paths out of the righthand side of blocks 534 and 541 are used along with the path 546.

Once valid key closure is established but the key has not been read in, the path 543 is used to exmine for the closed key being a clear key CE or total key TOT. At blocks 540 and 544 cler key closure is tested, the finding of a closed clear key resulting in setting the update counter to maximum in order that an aborted compute cycle follow immediately.

If the clear key is found in the open state at block 544, the total key status is accessed and read as indicated in block 545 and 547 to determine if a total key entry was made and sensed during a previous compute cycle. If the total key status is set, an exit along the path 526 occurs, such exit precluding the setting of the update counter in the CPU to a condition that will precipitate a compute cycle also precluding the writing of key down "status word C" in block 549. Absence of keyboard status C signal prevents any entry of keyboard information on subsequent cycles of the scale. It should be noted, therefore, that whenever a total key status is set as sensed in the block 547, exit along the path 526 occurs so that no further information can be read from the keyboard by reason of the status C of block 549 having not been set. Moreover, it should also be noted that the clear key is not affected by the block 547 total key status, since the clear key processing of block 540 add 544 occurs prior to the total key status steps of 545 and 547.

In connection with the sequence commencing at block 532, once a determination is made that a key has remained closed for three successive short cycles, the status word C is set and the update counter preconditioned to assure a compute cycle is immediately executed (assuming the key is a number key), This arrangement wherein the keyboard data has priority over the other steps assures keyboard information will be captured before its disappearance. This keyboard priority arrangement further implements the present scale concept that all processing will be done in real time without the aid of data storage outside the computer.

Once the keyboard steps are completed at block 530, a sequence is performed to determine whether a price per unit weight number should be retained or erased, and whether a tare number should be retained or erased. The criteria is that price per unit weight entries are to be erased or inhibited so long as the scale is within the weight dead zone, i.e., scale reading below 0.02 pounds, and tare entries are to be erased when the scale returns to the weight dead zone following computation of total value. In other words, if the total key status is set, then resetting of the tare entry with chart positions in the weight dead zone is desired. The weight dead zone clear price and clear tare entry steps are shown commencing at block 551 in FIG. 5 and extend up to block 567.

In block 551, data representing the contents of the two most significant weight indicating tracks on the scale chart, i.e., the tracks labeled "M" and "N" in U.S. Pat. No. 3,557,353 (mentioned above) are accessed and examined at block 552 to determine if the scale is within the weight dead zone, e.g., below 0.02 pounds as an example. The results of the weight dead zone test is identified with a status word at block 555 and tested at block 557 with the clearing of price per unit weight entry occurring as indicated at block 558 and the reading, testing and clearing of the tare status and tare memory being indicated at blocks 559, 560, 561 and 564.

Following completion of the price per unit weight and tare entry clearing, the motion test sequence of block 567-578 is performed, the sequence resulting in resetting the sequence counter, i.e., the counter which determines whether weight, price per unit weight, or total value information is displayed and blanking the display as indicated in the blocks 572 and 574. This resetting assures a minimum time of displaying information following motion cessation as explained later in the compute cycle operation. The motion sequence of steps commences with the reading and testing of the motion inhibit status in block 567 and block 568 to determine whether a motion detect operation should be performed or omitted. The present scale excludes the motion testing sequence for some time interval following a keyboard entry, in order that scale vibrations resulting from operator movement of the keys not result in a false motion indication. The motion read inhibit status of blocks 567 and 568 provides this motion testing exclusion in response to a keyboard input, the motion read inhibit status is set at block 538 in the program sequence.

If a motion test is to be performed, the motion signal which passes through inverter 58 (FIG. 4B) is regarded as a status signal in the microprocessor, is accessed and tested, blocks 569 and 570, with an affirmative indication of chart motion resulting in the setting of a motion indicating flag at block 571. Failure to detect motion causes flag reset at block 575, if the motion signal is sensed, the sequence counter at memory position O of the RAM is reset to the pounds indicating mode (see column 1 of Table II) at block 572.

BLINKING/FLASHING DISPLAY

Commencing with block 578 in FIG. 5 and continuing up to block 595, there is shown a sequence of steps which is used to achieve both blinking of the negative sign which is displayed with the tare weight indication, and flashing of the total price indication when the scale is in the total price or value display mode. It is to be noted that these blinking and flashing operations are in the present scale achieved in the microcomputer rather than being performed by mechanical or electrical timing arrangements. As indicated by the test at block 579, periodically the return, along path 596 to the starting terminal of the communicate cycle, occurs by traversing the blocks 580-595 rather than through the lefthand exit of block 579; during this occurrence the steps which achieve the blinking of tare weight negative sign and flashing of the total value indication are performed.

The blinking and flashing steps commence with incrementing and reading the least significant portion of the update counter in block 578. This least significant portion is the lower four bits of CPU register 15 in the register pair 7 update counter (as in MCS-4 Manual). This lower four bits of register 15 is identified as update counter "A" in block 578 while the most significant bits of the update counter, i.e., register 14 is identified as update counter "B" in block 587. On the communicate cycles wherein the counter "A" of block 579 has the value of zero, the sequence of steps commencing with block 580 is performed. This sequence commences with accessing and testing the sequence counter to determine whether a minus sign blinking or a total value flashing is to be performed, if the sequence counter indicates a value of 14 or more, then as indicated in column 1 of Table II, the scale is in either the total price or display blanking mode and the steps of block 591, 592 and 594, which provide flashing of the total value display, are to be performed. Flashing is achieved by turning the total value display off, that is, blanking the total value display during communicate cycles wherein the most significant portion of the update counter, i.e., CPU register 14 or update counter "B", has a value "14". The total price display is thus turned off for 32 communicate cycles whenever the most significant half of the update counter contains the value "14". The turning off of the total value display is achieved at block 592 and 594 wherein the sequence counter is addressed and arbitrarily set to a value of "15" which, as indicated in column 1 of Table II, achieves display blanking. The display blanking subroutine (FIG. 7A) is accessed as indicated in block 594 and performed by the instruction at line 1950 of Table I. Where the most significant half of the update counter does not contain the value "14", the lower exit from block 591 to block 595 is used.

Returning now to the test of block 581, where the CPU sequence counter (Table II) was tested to determine if the scale was in the total price mode, if this test indicates the total price mode has not yet been reached, that is, if the sequence counter has a value of less than "14", the righthand exit from block 581 is used, and the sequence counter tested for a value of 13, i.e., the price per unit weight mode. If the sequence counter has a value of less than "14", at block 581 and is not at "13" at block 582, then it must according to column 1 of Table II, be in the state "1", "10" or "12", which correspond to the tare and net weight display modes, wherein blinking of a negative sign may be desired. In the tare weight mode, a negative sign will always be present, and blinking is desired. In the net weight display mode corresponding to sequence counter state "12", the net weight can have a negative value if the operator has entered a tare value greater than the weight of the article placed on the scale platter. In the present scale, it is desired that this negative net weight also be displayed with a blinking minus sign.

It should be understood that tare display and a negative sign appears anytime the tare value exceeds the platter weight reading. When tare is displayed the sequence counter can be in any of the states "1", "10" or "12". Sequence counter state "1" forces the scale into the weight display cycle for 171 communicate cycles prior to advancing to the price per pound mode. Either sequence counter states of "10" or "12" allows entry into the price per pound mode sequence counter state "13".

In the test of block 582, if the sequence counter is found in either the tare or the net weight conditions, a righthand exit to the block 584 results and a test for the most significant digit containing a negative sign is performed as indicated at blocks 584 and 585. Failure to find a negative sign, as well as finding the sequence counter is the price per pound mode, provides in a return by the path 593 to the mainstream of the communicate cycle. If a negative sign is found in the most significant digit position in the test of block 585, the steps which perform the blinking of the least significant digit commence at block 587. Negative sign blinking in the present instance is achieved by blinking during the presence of a "binary 2" value in the most significant half of the CPU register pair 7 update counter. The test for most significant half of the update counter in CPU register 14 is indicated at block 2120, a count of 2 resulting in a righthand exit and loading of the blanking code at block 589, while a count other than 2 results in the bottom exit and loading fo the minus sign in block 588, whichever of these display indications is loaded to the accumulator being displayed as is indicated at block 590.

Following the blinking and flashing sequence, the update counter is incremented and tested for the count condition selected for initiating a compute cycle, i.e., a count of zero in the upper half of the update counter. Failure to find this condition results in a return along path 596 to the communicate cycle starting terminal, while finding of a compute cycle initiating count causes presetting of the update counter at block 598 in preparation for the next sequence of communicate cycles, this presetting is selected to provide approximately one second of time elapse between successive compute cycles.

SUMMARY-COMMUNICATE CYCLE

The events included in the scale communicate cycle are as follows:
1. Generation of D time pulses for weight, keyboard and status input and for numeric and word display output,
2. Keyboard contact bounce exclusion and reading time election,
3. Price per unit weight and tare memory clearing in response to weight within the weight dead zone,
4. Initiation of new scale and display sequence in response to platter motion,
5. Blinking and flashing of selected display quantities.

In the present scale, the communicate cycle which is repeated frequently, at about 5.9 millisecond intervals, is limited to the fewest possible number of functions in order that its duration be as short as possible and the above listed events which relate to the inputing and outputing (i.e., communication) of new information, be repeated as often as possible and with sufficient frequency to assure an operator's visual and manual capabilities are accommodated. In a similar manner, the initiation of computation events at spaced intervals is in keeping with the limited need for new computation information to prevent operator confusion.

COMPUTE CYCLE

The compute cycle is in reality a plurality of program paths which are alternately followed depending upon conditions encountered.

When the CPU display update counter reaches a condition of all zeroes as a result of the scale having performed the predetermined number of communicate cycles, i.e., 171 in the preferred embodiment, or as a result of presetting this update counter, the decision of block 597 in FIG. 5B will enable the path 586 to the block 598 which commences a compute cycle of scale operation. The all zero condition in the update counter may result from presetting instructions such as block 505, where the update counter is preset to maximum to insure a compute cycle occurs following the first communicate cycle after scale turn on, or block 548 wherein the update counter is preset in response to a determination that valid keyboard data is available and should be sampled quickly before the operator has time to release a depressed key. The update counter is also forced to a maximum condition as indicated at block 651 and at other locations in the program as explained subsequently.

It should be noted that upon commencing scale operation at block 500 in FIG. 5, the update counter at block 505 is immediately forced to a condition which will initiate a compute cycle so that following one trip through the communicate cycle of FIG. 5A, the path 586 will be employed and a compute cycle follow. The initial step of this following compute cycle is of course, indicated by block 598 where the update counter is preset to a low value which will cause repeated trips through the FIG. 5A communicate cycle sequence upon completing the block 505 initiated first trip through a compute cycle. Restating this concept, it can be said that following any trip through a compute cycle sequence in FIG. 6, the scale will execute a predetermined number of communicate cycles unless interrupted by the appearance of new input information.

As indicated previously, the overall philosophy of the present scale is to relegate to a compute cycle as much of the scale operating sequence as possible while retaining in the communicate cycle the capability for meeting new data inputs and the real time display requirements. In accordance with this philosophy, the program steps of the compute cycle are provided with capability for performing keyboard code conversion and checking, weight range testing, weight signal code conversion, tare weight subtraction, most significant zero blanking, weight times price per unit weight multiplication, and total price rounding functions. At several points in each of the possible compute cycle sequences, provision is made for aborting a compute cycle and returning to the commencing point of the communicate cycle in response to an operator omission and certain other events. As indicated at block 651 where all of the compute cycle aborting paths terminate, during the abort sequence the update counter is set to a maximum condition before returning to the communicate cycle terminal point in order that a new compute cycle will immediately follow the next communicate cycle.

Figure 7B:
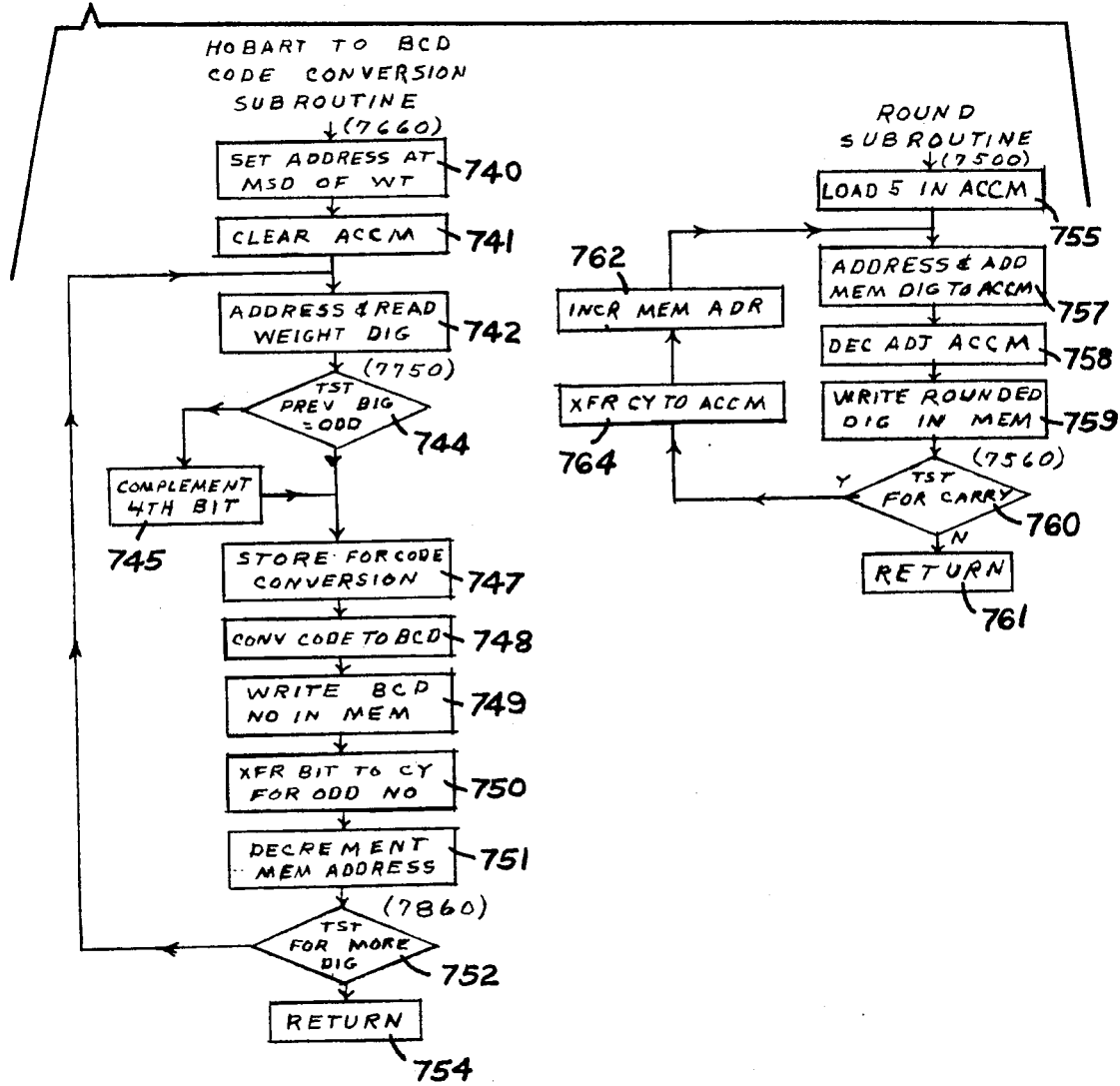
Figure 8:
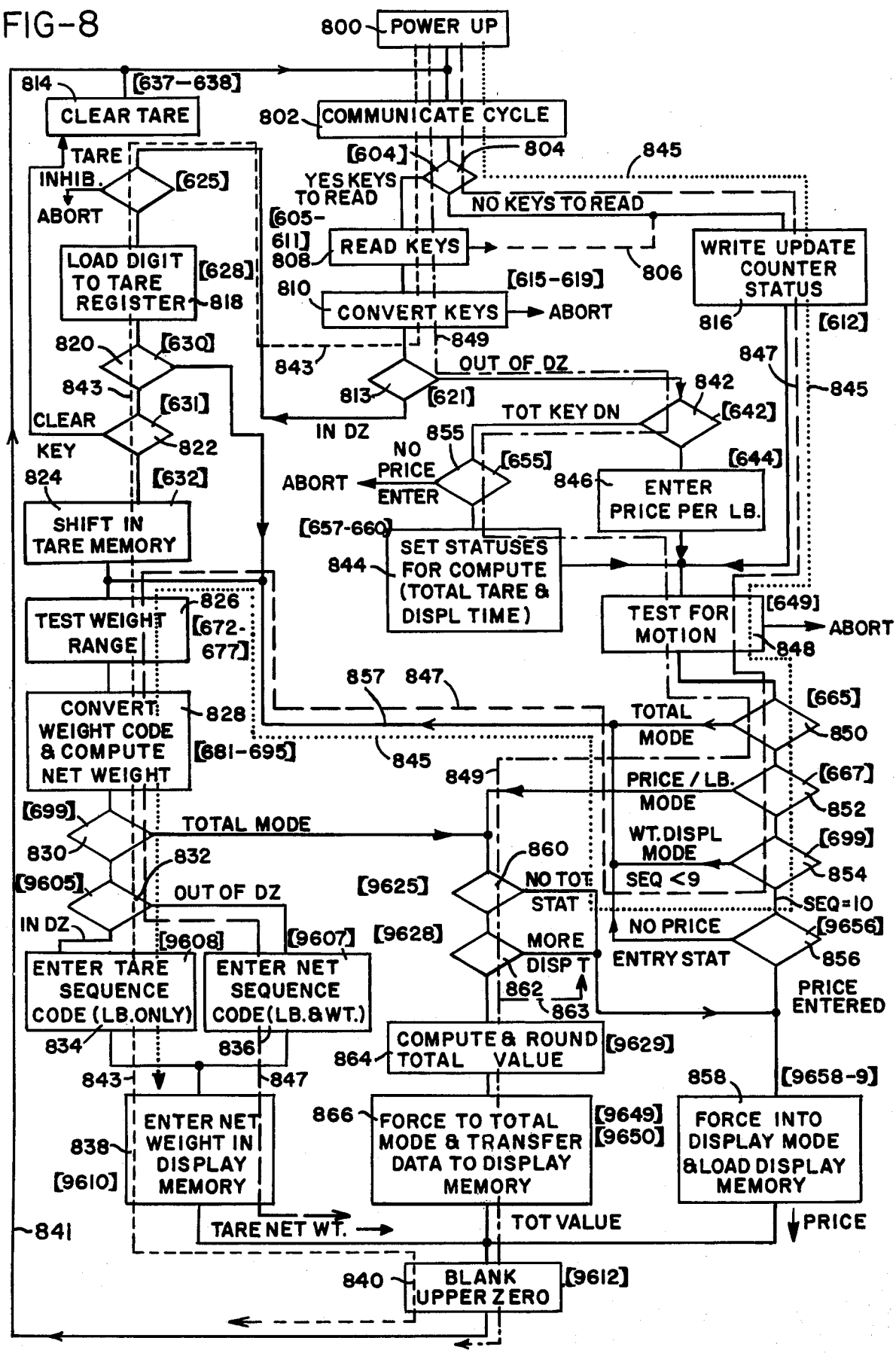
FIG. 8 is an overall flow diagram of the system.

FIG. 8 of the drawings shows the program flow diagrams of FIGS. 5, 6 and 7 in a simplified form wherein the interrelation between functions in the scale operating sequence can be discerned. Details of the scale operation including many of the compute cycle abort points and error condition responses are omitted from FIG. 8, for simplifying the overall view presented therein. The following compute cycle description thus makes primary reliance on diagrams of FIGS. 5, 6 and 7 and the program listing of Table I. Reference to FIG. 8 is made during the initial description of an operating sequence and thereafter only as needed to indicate interrelationships.

In FIG. 8 the numbers 802-840 are used in the customary manner to identify blocks in the flow diagram while numbers enclosed in parentheses, i.e., the numbers 630 at block 820 and the number 9629 at block 864, relate the FIG. 8 flow diagram blocks to blocks in the more detailed flow diagrams of FIGS. 5, 6 and 7. Only major decision points in the program have been indicated, blocks 822, 852, 862, etc. The decision made in each of these blocks is indicated along the path leading from the decision block in lieu of the more formal indication within the decision block as shown in FIGS. 5, 6 and 7.

In FIG. 8, the paths identified by the numbers 843, 845, 847, etc., indicate a selected one of the compute cycle operating sequences in the present scale. The number 843, for example, indicates the decisions and functions which occur when the scale has been sitting in the unused condition and a keyboard key is pressed for the purpose of entering a digit of tare weight information. Line 845 in FIG. 8, as another example, illustrates the sequence occurring after tare information has been received by the scale, that is the sequence which causes an entered digit of tare information to be illuminated on the display 20 (FIGS. 1 and 4C). In a similar manner, the lines 847 and 849, respectively, indicate the sequence of steps followed through the flow charts of FIGS. 5, 6 and 7 and the Table I listing in order that digits of weight be displayed and a total key entry be received into the computer.

Returning to the line 843 in FIG. 8, it will be noted that if a tare entry is to be made, then immediately following the communicate cycle at block 802, the keyboard related steps of blocks 804, 808 and 810 are to be performed. As indicated by the parenthetic numbers associated with these three keyboard related blocks, the keyboard steps are described in detail by blocks 604-619 in FIG. 6 of the drawings. To describe the path 843 sequence, each of the major events along path 843 is described briefly commencing with the keyboard sequence.

KEY DECODING

During the communicate cycle, the sequence of events represented by blocks 532-549 was employed to determine whether a key closure sensed at block 524 should be read into the system, ignored for being in a bounce condition, or ignored for having previously been read (i.e., the status A, status B and status C tests of blocks 534-549). If the key closure sensed at block 524 is found acceptable for computation purposes, the block 532-549 sequence terminates with the setting of a flag signal called "status C" at block 549 to tell the next compute cycle, provoked at block 548, that a key reading sequence should be performed. Commencing at block 601 in FIG. 6A is the key reading sequence which result from the decision of blocks 548 and 549. This key reading sequence commences with loading and testing key down status C flag, blocks 601 and 604, the status test of block 604 providing a jump around the keyboard reading sequence along path 603 for compute cycles which have been initiated by something other than sensing key closure at block 524. Such compute cycles can be initiated by performing 171 communicate cycles, or by the events of blocks 505, 651, etc., wherein the update counter is forced to a compute cycle initiating condition.

Just prior to testing the key down status C signal to determine if keyboard information processing is to be performed, the motion read inhibit status is placed in the "one" condition as indicated at block 602, in order that motion testing not be performed for some time interval following a keyboard actuation. It has been noted that keyboard actuation is capable of initiating vibration and resulting false motion signals. The status bit which is set in block 602 is effective during the next subsequent communicate cycle at block 567 and 568 to inhibit motion signal testing. The motion read inhibit status is reset at block 602 following execution of the intervening program steps which provides the desired motion detect inhibits time of approximately 700 milliseconds.

If the key down status C test of block 604 indicates that the reading of key information is appropriate, the status C flag is reset, block 605, the addressing constant for key reading placed in memory, block 607, and the instructions at lines 2430 and 2630 in Table I and the sequence of key reading steps 608-611 commences. In the steps 608-611, the key memory at locations 21, 22 and 23 in RAM "0" is examined, one memory location during each trip through the 608–611 steps, to find the single bit of information among the twelve bits stored indicating that a key has been closed. As shown in FIG. 4A the keyboard is wired such that during D-6 time intervals, power is applied to the first column of keys (numbers 1, 4, 7 and CE), these assigned key numbers of 1, 2, 3 and 4, respectively. The powered circuit is labelled KYBD. St. A. During the D6 time pulse, each of the four keyboard output lines B0–B3) is examined for being in the powered state, indicating a key closure.

During one of the D6, D7 or D8 keyboard sensing times, a signal will be found on one of the four keyboard output lines if a key has been depressed to make the connection between a D time input signal line and an output signal line. The block 608–611 sequence repeats via the path 606 until a closed key is found, whereupon the righthand exit from block 609 leads to the sequence for testing and converting the key closure signal to BCD form. The lower exit from block 611 provides a safety exit from the block 608 ∝ 611 sequence assuring no program hang up will occur in the event a noise pulse or other unpredicted event allows entry into the blocks 608 ∝ 611 sequence without a keyclosure actually existing.

The conversion of key closure information from the form of one binary bit of a possible twelve bits in key memory, (RAM locations 21, 22 and 23 in FIG. 11) to a BCD coded word representing a number on the keyface of FIG. 3 is performed in a plurality of steps which commence with the finding of a closed key indication at block 609. These steps involve adding to the memory bit number which contains the closed key indication, a conversion constant having a value of zero, four or eight in accordance with whether the key being converted is located in the first, second or third keyboard column (ST. A, B or C) in FIG. 3, and then using this summation of bit number and conversion constant as the address for a table look up operation in the table at line 5010, Table I. For example, if the operator has pressed key 8, the binary signal representing closure of this key is stored in bit position 3 of RAM location 22 and therefore has a bit number of three. Since the key 8 is located in the second column, a numerical constant of four is added to this bit number of three to provide a table look up address of seven as indicated at line 5080. A look up address of seven provides BCD output of eight which corresponds with the keyface numeral.

By way of a second example, the numeral six in the third column of the FIG. 3 keyboard is stored at bit two of RAM location 23; by adding this number two to a conversion constant of eight, a table address of ten results. As indicated at line 5110 in Table I, address 10 provides a key output of BCD six as desired. In the flow diagram of FIG. 6, the constants zero, four and eight are developed at block 610 by the instructions at line 2780 and 2790 of Table I. The conversion from bit position to key number, i.e., the conversion from a one bit in the third memory position, from the first example above, to a key number position is performed at block 616. The addition of a correcting constant is indicated at block 618 and the table look up operation is set at block 619.

The conversion of block 615 employs the KBP instruction at line 2900, Table I. This instruction, as indicated in the *Intel Users Manual,* provides an error signal (BCD 15) if two key closures in the same key memory word (the same keyboard column in FIG. 3) are detected. The test of block 617 is responsive to this KBP instruction error indication and provides a compute cycle abort along the lefthand exit from the block 617, if the operator has erroneously closed more than one key in any vertical column of the keyboard.

KEY ERROR

If the operator should close two keys in the same horizontal row in FIG. 3, for example the 8 and 9 keys, the keyboard sequence just described will respond to the first encountered key, i.e., the leftmost of the two closed keys, and will ignore the rightmost of the two closed keys. If should be noted, however, that the keyboard status sequence commencing at block 532 in FIG. 5 will not permit the second of two closed keys in the same horizontal row to be read as data since the finding of a key open condition must precede the sensing of key closure if the key status B and C signals of blocks 542 and 549 are to be set. This arrangement of ignoring the rightmost of a horizontal two key closure and requiring a no key condition immediately preceding the reading of any key closure provides key roll over protection in the keyboard horizontal rows while the previously mentioned compute cycle abort, commencing at the lefthand exit of block 617, provides key roll over protection in the keyboard vertical columns. It is also to be noted in the above sequence that the CE and TOT are regarded in the program sequence as numeric values and provide numeric outputs of 11 and 12 in the line 5010 conversion table. These numeric values are interpreted as the clear entry and total functions at the appropriate point in the program.

TARE INHIBIT

Figure 4B:
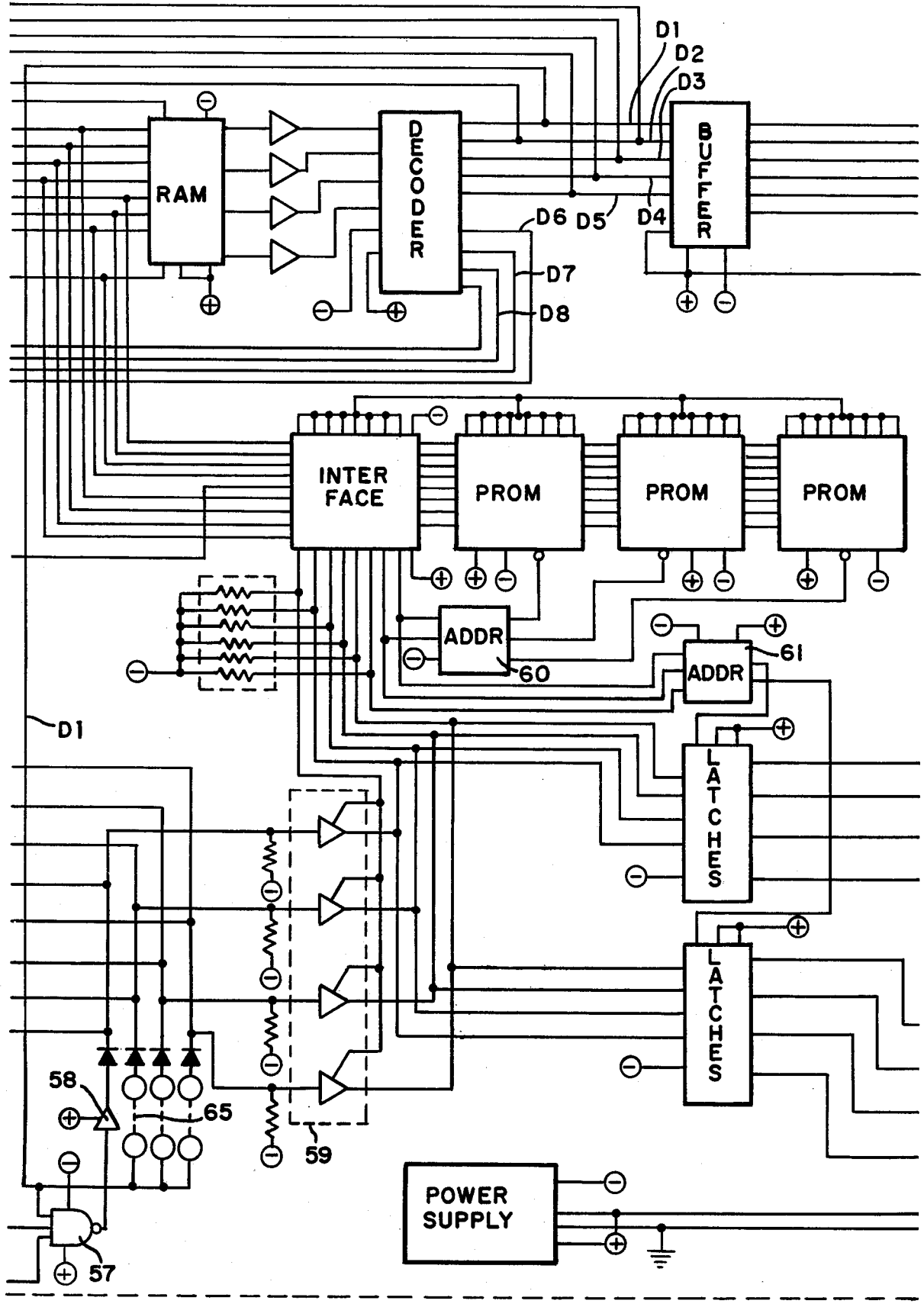
Figure 4C:
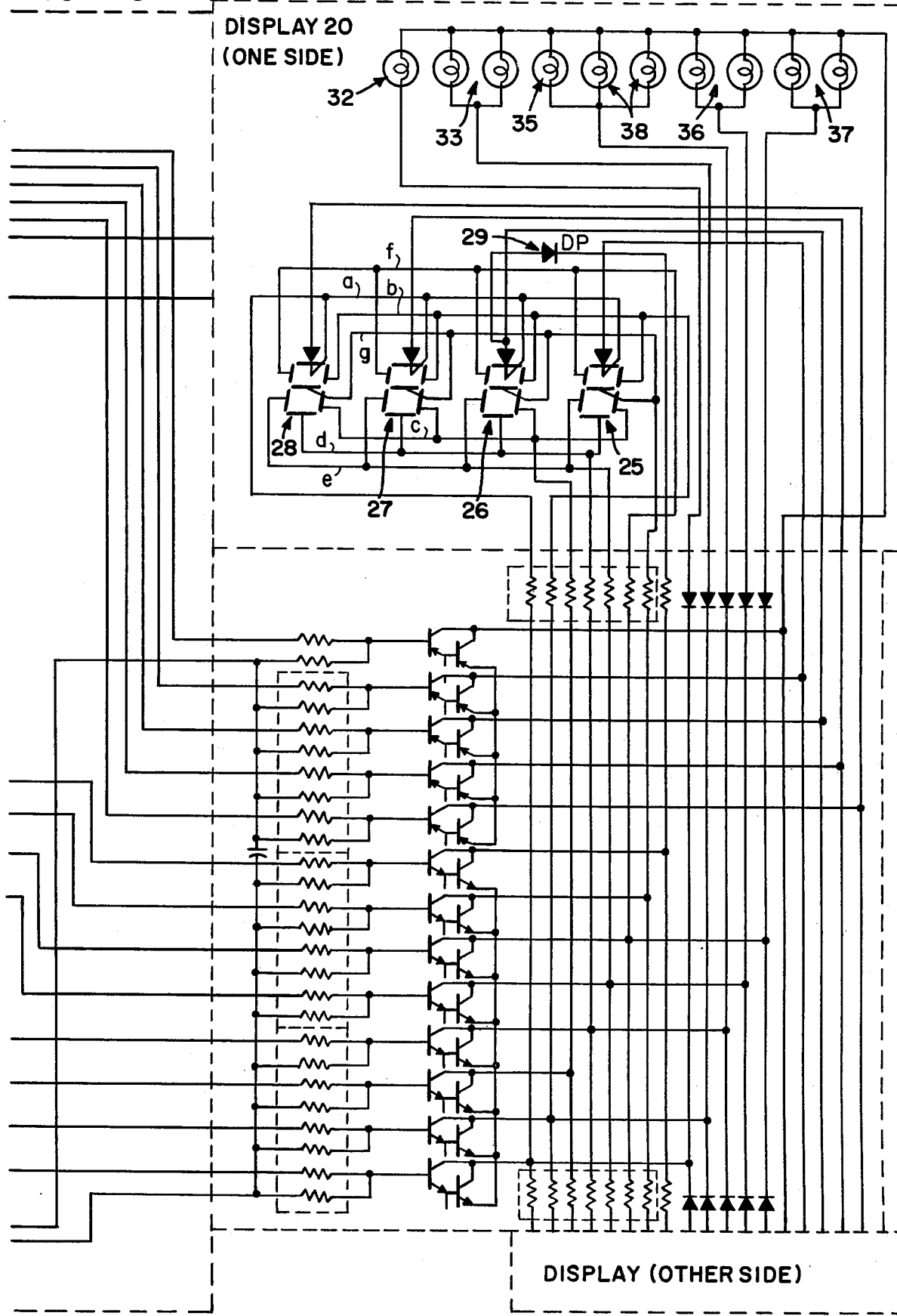

Continuing now with the description of events along the tare entry path 843 in FIG. 8, if tare is being entered the scale chart is in the weight dead zone so that the lower exit from block 621 (block 621 appears in both FIG. 6 and FIG. 8) is employed, and the tests of blocks 624 and 625 accessed to determine if the tare inhibit jumper 65 in FIG. 4B indicates tare capability is to be omitted from the present scale. Presence of the jumper 65 indicates tare omit and results in a lefthand exit from block 625.

If the tare inhibit jumper is absent so that storage of the decoded keyboard digit as tare is desired, the tare memory is addressed for later use, block 627, the key number read in, block 628, the key tested for being a total or clear key blocks 630 and 631, then the least significant digit contents of the tare memory shifted to the second significant position and the key number entered into the least significant position, blocks 632 and 634. Finding of a total key at block 630 results in a jump around block 632 and 634 while finding a clear key at block 631 not only avoids the entries of block 632 and 634 but also initiates the clearing and compute cycle aborting steps of blocks 637 and 638.

Compute cycle aborting, which is usually done as the result of an operator action, includes within the abort sequence setting the update counter, register pair 7, to a maximum condition. This preloading in the abort sequence assures that a new compute cycle will commence immediately after the communicate cycle which automatically follows a compute cycle abort. The concept of aborting upon finding an undesired or overriding condition in the compute cycle minimizes time the computer spends outside the display driving communicate cycle, since the compute cycle steps following the improper or overriding condition are not performed. It is to be noted that just prior to leaving each communicate cycle initiated by an aborted compute cycle, the update counter is preset, at block 598, to cause repeated communicate cycle executions once a compute cycle is successfully completed and the display information thereby updated. Most compute cycle abort events return to the starting terminal of the communicate cycle at block 500, however, the abort of blocks 637-639 returns instead to block 562 in the communicate cycle tare-clear sequence in order that a "D" time display sequence not follow a clear entry command.

WEIGHT RANGE

Figure 2:
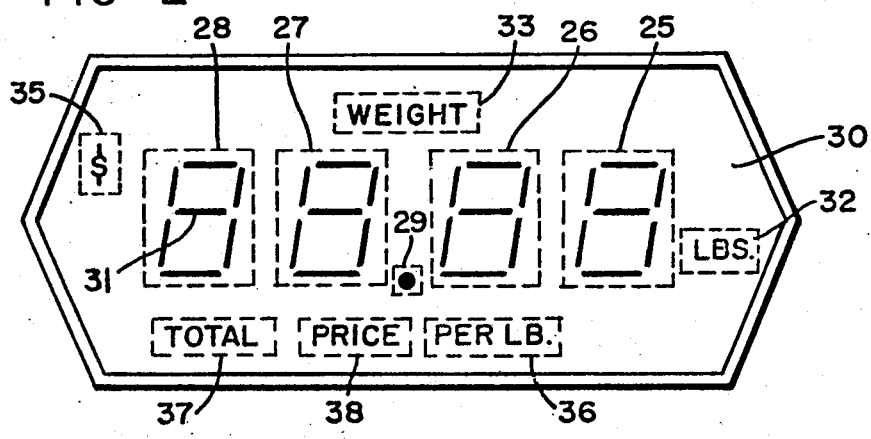
FIG. 2 shows one face of the display unit.

Returning now to block 631, if neither the total key not the clear key is present, which should be the case in following the path 843 in FIG. 8, the tare functions of block 632 and 634 are performed, the weight range test of blocks 672-678 is accessed. This test is indicated at block 826 in FIG. 8. In the weight range test, if either of the E and G weight chart photocells have provided data bits for the weight reading under consideration, the weight chart is determined to be within its weighing capability, i.e., between weight indications of 0.00 and 25.00 pounds for a 25 pound domestic scale. The concept of testing E and G weight chart photocell signals to determine weight values within the scale range is more fully explained in U.S. Pat. No. 3,557,353, if an improper weight indication is found at block 674 or 675, the sequence counter of the CPU RAM Location 0 is set to a "one" condition to cause illumination of the word weight 32 in FIG. 2, and the display error subroutine executed to provide illumination of the center bar segments of the numeral displays. The combination of four illuminated bar segments and the sign 32 is used to indicate an improper condition relating to weight in the scale, as was explained in the scale characteristics.

GROSS WEIGHT LESS TARE

If either of the weight chart E or G track photocells, but not both, is found to be in the light condition, indicating a proper weight value, the compute net weight sequence indicated at block 828 and commencing at block 681 is accessed to subtract the tare weight entry from the gross weight reading. The compute net weight sequence begins with subroutine conversion of scale chart gray code information into binary coded decimal form as indicated at block 681. The properties of the scale chart gray code and an example of this conversion may be found in U.S. Pat. Nos. 3,557,353 and 3,439,760, this conversion is performed in the present instance by the code conversion subroutine commencing at block 740 in FIG. 7, with the use of the code conversion table commencing at line 7950 in Table I.

Once gross weight and tare weight quantities are accessed from memory, block 682, the subtraction of these two quantities is performed by the looped instructions 684-687. The path 686 around these instructions provides access to successively higher order digits for the subtraction sequence until the test of block 687 indicates all of the required subtraction has been performed. Since the numbers being subtracted are in binary coded decimal form, under certain conditions it is necessary that a correction constant of 10 be included in the subtraction process. The test for this correction is indicated at block 688 and found at line 4390 of the Table I program.

It is, of course, possible that the scale operator has entered into the scale a tare value exceeding the weight placed on the scale platter, in this case the subtraction of block 684-687 will involve a subtrahend which is larger than the minuend. When a subtraction is performed under these conditions the accumulator carry bit in the CPU is set to a "one" condition. The set carry bit is sensed at block 691, and if present results in a reverse subtraction process and subtraction of the original minuend from the original subtrahend to obtain a difference quantity indicating the amount by which the tare weight exceeds the platter weight. This difference quantity is ultimately displayed as a net weight but is, however, accompanied by a negative sign indicating tare value was greater than the platter weight.

It should be noted that the normal displaying of a tare entry is achieved in the present scale by exactly the same process as described here. When tare weight display is to be accomplished, the tare value (the subtrahend) is greater than the weight value (the minuend), which is zero. Thus, the second subtraction is performed and the required negative sign developed at block 695. For this reason in the next few paragraphs of this specification where the tare entry of path 843 in FIG. 8 is being followed, the tare data can be referred to as a net weight value. Addresses for performing the second subtraction are set at block 693 while the negative sign indicating a larger subtrahend value is set at block 695 in response to an indication of two subtractions having been performed in the test of block 694. At block 692 a tare status flag is set indicating whether a negative or positive net weight value has been developed; this staus flag is tested at block 9631 to prevent computation of total value with a negative net weight.

DISPLAY TEST & LOAD

Ultimately, once net weight (or tare) is computed, the display memory is loaded with this value, as indicated at block 9610, in preparation for weight displaying during a following communicate cycle. Prior to transferring the net weight to the display memory, however, the sequence counter test of block 699 is performed to determine if the scale is in the total value mode. The possibility of total value mode exists following net weight computation, arising from reuse of the weight range test of block 672-675 for a new computation of net weight in block 681-685 during the total value mode as can be observed in FIG. 8 from one path 857.

The addresses used in the transfer to display memory at block 9610 are set at block 9602, and a code which determines which of the word lamps 32, 33, 35, 36, 37 and 38 (FIG. 2) are to be illuminated during the next subsequent communicate cycle is loaded into the sequence counter as indicated by the blocks 9604-9609. The criteria for the block 9607 and 9608 test is that if the scale chart is positioned within the weight dead zone, only the word "LBS" is to be illuminated. The condition results if the sequence counter is loaded with the number ten, while if the scale chart is positioned outside the weight dead zone, then both the words "weight" and "LBS" (sequence code of 12) are desired. The selected sequence code is placed in the sequence counter at block 9609 and the transfer of net weight to display memory performed at block 9610. An inverted status indication is employed in the Table I steps relating to block 9605 in order that ROM space be saved.

Prior to actually displaying the net weight or any other of the possible values stored in the display memory, i.e., tare, price per pound or total value, the most significant digit of this quantity is tested for having zero value in order that the scale comply with the common practice of not displaying zeroes in the most significant digit position of any number. This test is performed at the blocks 9612; a zero found in the most significant position is suppressed as indicated at block 9615. This suppressing involves the writing of BCD code 15 in the most significant digit position as performed at line 6532 and 6540 of Table I. Upon completing the most significant digit suppressing, which is indicated at block 840 in FIG. 8, a return to the communicate cycle commencing point occurs as indicated at block 9617 and by the path 841 in FIG. 8. In the next following communicate cycle, the newly computed net weight will be displayed.

If the digit of tare information entered in path 843 in FIG. 8 is followed by a second tare digit in some subsequent compute cycle sequence, events similar to that indicated by the path 843 occur.

In the interval between tare digit entries or in the interval following tare digit entries, the entered digits are displayed by repeated trips through the communicate cycle. A minimum tare display time of 171 communicate cycles (about one second) is assured by the sequence counter being set to a count of "one" condition at line 1690 in Table I, block 572 in FIG. 5. A sequence counter setting of "1" requires that 171 communicate cycles occur before entry into the next following sequence counterstate, i.e., the display of price per unit weight information.

Following completion of each group of 171 communicate cycles displaying the tare digit(s), a trip through the compute cycle will occur following the path 845. The path 845 includes a decision of no keys to be read at block 804 and writing the update counter status at block 816, this writing being used in the price per unit weight display mode and being without consequence in path 845. The path 845 also includes a test for motion (block 848) passage through tests 850 and 852, and an exit from the leftmost side of block 854 to the weight range test block 826. After the weight range test of block 826, the path 845 is coincident with the path 843 which was described above. During each of the path 845 trips through the compute cycle, the displayed tare value will be recomputed using the platter weight indication developed at blocks 826 and 828. A new display sequence using the updated tare value is initiated by return along the path 841.

Following display of tare digits for some time interval, the operator will place a package on the platter 12. Movement of the scale platter in response to the package will cause the motion test of block 848 and block 650 in FIG. 6, to precipitate compute cycle abort decisions from the righthand exit of block 650. Compute cycle aborting involves update counter setting, block 651, and return to the communicate cycle starting terminal indicated at block 652. By way of these compute cycle aborting decisions, the tare display of path 845 will terminate at block 848 so long as the scale is in motion.

In the present scale system, platter motion is detected by way of the gate circuits 50 and 51 and one-shot pulse generators 54 and 55 in FIG. 4A, responsive to the A and C weight indicating chart tracks as earlier described. Signals generated by the motion detecting circuit output gate 57, via inverter 58, are received as status bits through the tri-state buffer 59 into the microcomputer by way of the data bus. These signals are stored in status word zero of RAM register 1 (FIG. 11). The stored signals are accessed at block 649 in FIG. 6 and tested at block 650 to determine if the scale is in motion. It should be noted that scale motion is also detected at block 570 in the communicate cycle of FIG. 5 in order that illumination of the display 20, FIG. 1, be inhibited while the scale is in motion.

Once weight induced platter motion terminates, aborting of path 845 at the motion test of block 849 will terminate. Since the detecting of motion sets the sequence counter to a condition of "", block 572 in FIG. 5, the lefthand exit from block 854 in FIG. 8 will be employed, i.e., a sequence counter code less than nine is present, and the weight range test and net weight computation of blocks 826 and 828 performed. Following net weight computation, the test of block 830 is not met, i.e., the system is not in the total mode. However, the test of block 832 finds the scale chart to be out of the dead zone so that a code of 12 is entered into the sequence counter at block 836 to both cause display of the "LBS" and "weight" signs (FIG. 2) and to modify the decision at block 854 during the next following compute cycle. Following block 836, the computed net weight resulting from the operator having placed an article on the scale platter is entered into memory, upper digit zero presence tested and blanked at block 840, and the weight is displayed during the next communicate cycles which are initiated by the return path 841. On successive trips through a compute cycle sequence with the platter loaded and motion terminated, the path 845 is modified to the extent that the lefthand exit from block 856 is used to enter the weight range test, and setting the sequence counter at block 836 alters the route through blocks 854 and 856.

PRICE PER UNIT WEIGHT ENTRY

Once the operator presses a first key of price per unit weight entry, the path 847 is no longer employed since the decision at block 804 indicates a key entry to be present. When the presence of a closed key is established at block 804, i.e., when the communicate cycle key status sequence of blocks 532–549 has been satisfied by the several communicate cycle trips needed to set the keydown status C at block 549, the key information is read and decoded at blocks 808 and 810 as described previously in compute cycle operation in connection with a tare key entry. The righthand exit from block 813 is also employed, in view of the scale chart being out of the weight dead zone. If the operator is properly entering a number rather than a total key, the lower exit from block from block 842 is employed and the price per pound entry sequence of block 846 performed.

As indicated by the reference number at 644 at block 846, the price per pound entry sequence shown in detail commencing at block 644 in FIG. 6B. In the price per pound entry sequence the binary key number representing the key depressed by the operator is entered to the price entry memory, block 644, this entry being into RAM position 10 (FIG. 11), and then shifted one position to the left, block 645, by way of the price shift left register at RAM locations 43–47, and returned to RAM position 11. This shift left operation is performed in order that the first entered digit of price per unit weight information ultimately appear as the most significant digit of the price per unit weight entry and the least significant digit position of the price memory be made available for price per unit weight digits entered during subsequent trips through a compute cycle sequence.

As digits from these subsequent entries accumulate at memory locations 11-15, each successive execution of the block 645 instructions operates on a greater number of entered digits, the digits being transferred from location 11-15 to location 43-47 and then back to locations 11-15 in shifted position, one digit at a time. The shift left register (locations 43-47) is employed in lieu of the more common shift left instruction since instructions for the microcomputer disclosed do not provide normal shift left capability. Following the first and each subsequent trip through the block 644-648 sequence a price entry status word is loaded into status word one of register 0 in the RAM (FIG. 11), this loading being accomplished at block 647.

The price per unit weight key entry sequence also includes setting the update counter status (RAM location 5 in FIG. 11) to a value of "15", block 648, (the instruction at line 3720 in Table I) as part of a sequence involving the blocks 862 and 816 in FIG. 8 to assure the price per unit weight display is not erased if the operator strikes the total key before at least 171 communicate cycles have been performed, i.e., before a time interval of approximately one second has elapsed. At block 862 in FIG. 8, the sequence counter is tested to determine if at least 171 communicate cycles have intervened since the last price per unit key entry was made, this test is indicated at block 9628 (FIG. 6D) and performed by the instructions at line 5660 of Table I. Setting the update counter to a "0" condition when a minimum of 171 communicate cycles have been performed is accomplished at block 612 (FIG. 6A) (line 2400 Table I).

Returning to block 846 in FIG. 8, once the price entry status word is set, block 647, the same compute cycle will use the lower exit of block 856 and enter the price per unit weight loading and display sequence of block 858.

The steps of block 858 are shown at block 9658 (FIG. 6D), these steps include setting the sequence counter to a state of 13, i.e., the price per pound mode. In the sequence counter 13 condition, the signs "price" and "per lb." 36 (FIG. 2) are illuminated to indicate numerals displayed represent price per unit weight entry. Information to be displayed as a result of the block 858 operation is transfered to display memory at block 9659 (FIG. 6D) and the display test (block 840 in FIG. 8) is accessed to blank the most significant digit of the displayed information if this digit is zero value.

Once the sequence counter is set to the "13" condition at block 9658, the lefthand exit from block 852 will be employed for subsequent compute cycles, this lefthand exit leading to the decision of block 860 where a righthand exit occurs since the total key status is not yet set. This will cause repeated display loading, block 858. This load function will cause the latest contents of the price memory, which may include a new key entry to be transferred to the display memory, the blanking test and blanking of block 840 performed, and the path 841 used to initiate a new sequence of 171 communicate cycles.

TOTAL KEY COMMAND

At some subsequent time, it is contemplated that the operator will strike the key TOT (FIG. 3) in order that the scale perform the computation and display of total value information. The path 849 in FIG. 8 indicates the compute cycle of events which occurs immediately following verification of a TOT key closure in communicate cycle operation. The path 849 involves the righthand exit from block 813 and the lefthand exit from block 842, since the scale is respectively out of the dead zone and the TOT key is depressed. The path 849 also employs the lower exit from block 855, and a compute cycle abort decision is used where the operator strikes the TOT key before having entered any price per unit weight digit. In block 844 which corresponds to blocks 657-660 (FIG. 6B) a status flag is set indicating that the total key has been depressed, block 657, and the tare reset status is set (block 658). The tare reset status is used at block 559 in the communicate cycle sequence (FIG. 5) to enable resetting tare upon the scale next entering the weight dead zone. As indicated earlier in the scale characteristics, the tare memory is reset in the present scale when the total key TOT has been depressed and the scale chart returns to the weight dead zone; these will be the conditions when the scale operator completes a weighing and computing transaction.

At block 659 (FIG. 6B) the status switch information from jumpers 65 (FIG. 4B) is read to determine the display duration desired for the price per unit weight entry. It has been found that in many scale uses a customer having a purchased item weighed on a computing scale is especially interested to observe the price per unit weight entry made by the scale operator. The jumpers 65 make provision for field selection of the minimum price per unit weight display time, in order that the need of the scale operator and the customer both be met. The status word which is read at block 659 (FIG. 6B) is tested at block 9628 to determine if another jumper selected increment of communicate cycles is desired to meet the minimum price per pound display time requirement. The status switch information read in block 659 is used to preset the update counter at block 660, with the lower exit from block 9628 being used only if a predetermined minimum amount of price per unit weight display has occurred. If the minimum price per pound display time has not occurred the righthand exit from block 862 is employed and the loading and displaying of price per unit weight information (blocks 858 and 840) are repeated. The diversion from the path 849 to achieve minimum price per unit weight display time is indicated at 863.

COMPUTE TOTAL PRICE (ARTICLE VALUE)

Following display time testing at block 862, the total price computation and rounding of block 864 is performed. The computation of total price commences at 9629 (FIG. 6D) where the total price or product location in RAM locations 32-39 (FIG. 11), are accessed and cleared and the tare status tested at blocks 9630 and 9631 to prevent total value computation in the event a negative net weight value has been determined. This might result from the operator entering a tare number larger than the weight of the article placed on the scale platter. The finding of a tare status code indicating negative weight value at block 9631 results in a display error condition indicated at 9632.

Multiplication of net weight and price per unit weight is performed by the program steps indicated at blocks 9634-9642 in FIG. 6D. This multiplication is performed by the process of repetitive addition. The path 9636 in the multiplication sequence repeats the process of adding the multiplicand digit to the total number of times dictated by the multiplier digit under consideration. The path 9643 provides access to successive multiplier digits and the path 9633 provides a jump around the addition steps in the case of a multiplier digit of zero.

Once multiplication is complete, the total price rounding and transfer sequence of blocks 9647-9652 is performed. In this sequence the round subroutine is used to increment the appropriate digits of the total price product stored in RAM locations. 32-39. At block 9649 the sequence counter is set to the "14" state (the total mode) while at block 9650, the transfer from product memory to display memory, i.e., RAM locations 32-39 to RAM locations 1-4 is accomplished. In block 9651 and 9652, the total price product in RAM locations 32-39 is tested for having a non-zero digit in the fifth most significant digit position, i.e., RAM location 38. Finding of a non-zero value in this digit position indicating that the product has overflowed the disply capability so that an error condition should be indicated. The sixth digit of product in RAM location 39 can also be tested for overflow. The steps of setting the sequence counter, transferring total price and testing the fifth digit overflow indicated in blocks 9649-9652, are represented by block 866 in FIG. 8. Following computation, rounding and testing of the total value quantity, the test for zero blanking in the most significant digit position, block 840, is performed and a return along path 841 performed to commence displaying the newly computed total value in communicate cycle operation, block 802.

TOTAL PRICE DISPLAY MODE

Following setting of the sequence counter to a "14" condition at block 9649 (FIG. 6D) a periodic compute cycle, executed as a result of 171 communicate cycles being completed will follow a path which includes the lower exit from block 804 (FIG. 8), passage through the blocks 816 and 848, a lefthand exit from block 850 through the weight range and net weight computation events, out the righthand exit of block 830 through blocks 860 and 862 to a new computation, testing and displaying of total value quantity. Display occurs during communicate cycle operation indicated at block 802. It should be noted that this path involves new computation of net weight and new computation of total price at blocks 828 and 864, respectively, it being intended that the total price number displayed by the scale be updated periodically, for example about once every second, so long as total price is displayed. It should also be noted if platter 12 is moved by some small amount as by a slight addition of weighed material to the platter, and this movement is less than required to activate the motion test of block 848, that the lefthand exit path from blocks 850 and updating of net weight and total value quantities will continue so that the scale is continuously and actively responsive to even minute changes of weight on the platter while total price is displayed. If during total price display it is desired again to display the net weight value which is being used to obtain the updated total price, the operator may, of course, disturb the platter. Platter disturbance activates the motion test of block 848 and causes compute cycle aborting. Alternately, the operator can also return the scale to weight display mode by striking clear entry key CE which is sensed at block 544 (FIG. 5A) and provokes an immediate compute cycle by way of blocks 548 and 549.

In the compute cycle which results from a clear key entry, the key test and decoding sequence of blocks 601-620 are performed and the right hand exit from block 621 employed. The scale is in the total price value and therefore out of the weight dead zone, and the read price sequence of block 633 is commenced where the binary key number is read and tested at block 636 for being a clear key entry. The finding of a clear key code at block 639 results in a jump to the clear price subroutine at block 640. This subroutine which is shown in FIG. 7, in blocks 724-731, returns the sequence counter to the weight displaying sequence code of "1", returns the price per unit weight memory to the "0" condition, blocks 725-728, and clears the price and total key statuses, blocks 729 and 730, so that the scale is placed in the weight display mode. It should be noted that the clear price subroutine does not erase the entered tare number, tare being erased only upon the scale chart being within the weight dead zone as indicated by the lower exit from block 813 in FIG. 8 down through the block 822, where a lefthand exit leads to the block 814 and the tare clearing sequence occurs.

The blocks 633-640 steps which access the clear price subroutine are omitted from FIG. 8 for simplicity; if shown, the steps would be located between blocks 813 and 842.

COMPUTE CYCLE - OVERALL

The paths 843, 845, 847 and 849 in FIG. 8 indicates four possible compute cycle sequence combinations in the present scale. In the course of describing these four paths and describing the function blocks in FIG. 8, several compute cycle sequence paths in addition to these four paths have also been defined. For example, the path leading from the righthand exit of block 860 when the scale is in the price per pound mode but the total key status memory has not been set, the compute cycle abort path from the left hand exit of block 855 when the weight indicating chart is positioned out of the weight dead zone; and the total key depressed prior to a price entry being made, have all been described. From the description of the four paths 843, 845, 847 and 849 and the described modifications of these paths, it should be clear that a great number of variatons are possible in the route by which passage through the compute cycle events from block 802 through block 840 is achieved. If each possible path between blocks 802 and 840 is considered, e.g., including such modifications as path change after the first and second and third price per unit weight digit are entered, the number of possible different 802-804 paths could be quite large. Listed below are scale events which result in the major different paths from block 802 through 840 in FIG. 8. The numbers 843, 845, 847 and 849 in the list identify entries which correspond to paths indicated in FIG. 8.

LIST OF COMPUTE CYCLE SEQUENCES 1. quiescent with 0.00 displayed
2. enter tare from keyboard (843)
3. tare display routine (845)
4. second tare entry from keyboard
5. article received on scale (chart moving)
6. chart stopped, chart out of range
7. chart stopped (in range), compute net weight
8. display net weight (847)
9. enter first digit of price per unit weight (minimum weight display time expired)
10. enter first digit of price per unit weight (weight display too short)
11. enter second digit of price per unit weight
12. enter total key (minimum price per pound display expired) (849)
13. enter total key (price per pound display too short)

14. compute total price
15. change platter weight (no motion signal)
16. display total price
17. change platter weight (motion signal but chart doesn't enter WDZ)
18. change platter weight (chart enters WDZ) From the description of the flow charts in FIGS. 5, 6, 7, 8 and 9, with the program listing of Table I, persons skilled in the art can identify the various possible paths between the blocks 802 and 840 in FIG. 8.

Typical compute cycle operating times for this scale are listed below. Incorporation of events performed in even the shortest of these sequences into the 5.95 millisecond communicate cycle sequences would significantly alter the communicate cycle operating time and diminish the display multiplex ratio, the portion of the communicate cycle wherein the display elements are illuminated. Such incorporation could also diminish the assurance of capturing a closed key in real time operation. Hence, it is significant that the sequences of the communicate and compute cycles are separated and apportioned as described, to assure complete scale functioning with a minimum of electronic components, and compatible with human response intervals, such as finger (digit) manipulation of keys or other manual devices, and visual recognition, deciphering, etc., of the display.

| | |
|---|---|
| Display weight, weight mode | 4 ms (miliseconds) |
| Display weight, two tare subtractions | 5 ms |
| Key entry, price/pounds mode | 3.7 ms |
| Motion aborted compute cycle | 0.8 ms |
| total Value Compute (3 digit × 3 digit multiply) | 37 ms |

Even though the computation of total value requires repeated use of the steps in blocks 9635-9642 (FIG. 6D) requiring computer time during which operation of the real time display is prevented, the operating sequence of the scale is so arranged that this cessation of display occurs during transition between the price per unit weight display mode and the total price mode. Location of the time consuming compute operation in this position is effective to prevent display degradation both when the display is sequencing through the weight/price per unit weight/total price sequence in response to operator actions, platter loading, numeral entry, etc., and also when the scale is sequencing through its operating sequence automatically after platter motion, or in the alternate scale embodiment described herein wherein net weight, price per unit weight and total price are displayed in an automatic sequence.

INTERLOCKING

It should be noted that even though the sequence compute cycle, communicate cycle, compute cycle is precipitated by a compute cycle abort event, a repeated series of compute cycles which would terminate operation of the real time display is prevented by an interlocking arrangement. An example of this interlocking arrangement is found in the situation where a key closure has been verified as valid by the block 532-549 sequence (FIG. 5A), and an immediate compute cycle precipitated by the update counter setting of block 548. If this keyboard initiated compute cycle should end with a compute cycle abort as, for example, would occur if the operator had pressed two keys in the same vertical column (block 617) it would appear that the steps of the block 651 and 652 in the compute cycle abort sequence (update counter set to maximum in order that a compute cycle immediately follow the communicate cycle initiated at block 652) would have the effect of locking the scale in a repeated series of compute cycle operations. It should be noted, however, that this undesired operation does not occur since the keyboard status "words" of block 532-549 preclude keyboard reading and decoding in the resulting compute cycle until an "all key open" condition has been sensed. Even though the operator maintains a closed key closure condition, only one compute cycle will be devoted to an attempted reading of double keys as a result of the interlocking provided by the keyboard status steps, blocks 532-549. In the compute cycle which results from update counter setting at block 651 the keyboard reading and decoding steps of block 605-619 will not occur and the compute cycle abort condition of block 617 will be avoided since the test of block 604 precludes keyboard activity until the "all key open" condition has been detected. The keyboard status sequence of blcks 532-549 is similarly effective to prevent other acts performed on the keyboard from noticeably affecting operation of the real time display.

It is also to be noted that no acts performed on the scale platter can alter the desired motion signal response which is to blank the display. Motion (or "no motion") signal is derived directly from the chart and the photocells A-N, thus, this signal is directly related to whether or not the weight code signal being "read" is changing, and whether the platter has stabilized with an article on it. Moreover, events occurring during the compute cycle of the present scale such as computation, are generally immune to operator intervention, (except for scale motion) since communication of the microcomputer with outside events occurs during communicate cycle operation of the system.

SEQUENCE AND UPDATE COUNTER OPERATION

In the preceding description, it will be noted that two counters, the display update counter and the sequence counter, are used to determine the operating sequence of the present scale. In particular, the display update counter which is located within the CPU (register pair 7, see Intel handbook) is used to determine when a sufficient number of trips through the communicate cycle have occurred, and a trip through the computate sequence is therefore appropriate. As indicated above, the update counter can reach the count of "0" condition either as a result of being incremented one count each time a trip through the communicate cycle is performed, or as a result of presetting (block 505). It should be noted that the update counter (CPU register pair 7 is separate and distinct from the update counter status word at RAM register location 5 (FIG. 11). The update counter status word is used to indicate when a full 171 communicate cycles have been counted and approximately one second has elapsed, with the price per unit weight entry being displayed; 5.975 ms × 171 equals 1.022 sec.

The sequence counter is located at RAM location "0" (FIG. 11) while the address information needed for accessing this RAM location is permanently stored in CPU register pair 6 (a programming convenience). As indicated in the first column of Table II, six sequence counter states are contemplated, identified by counts 1, 10, 12, 13, 14 and 15. Each of these states is forced or preset in the sequence counter rather than obtained by incrementing from a previous state. (The sequence counter in this sense can be considered a sequence control register.)

The sequence counter serves two major functions in the scale, the first of these functions being selection of paths through the compute cycle sequence of blocks 802–840 in FIG. 8. Examples of this sequence counter function are found at blocks 850, 852 and 854. The second function of the sequence counter is to control which of the function word signs 32, 35, 36, 37 and 38 (FIG. 2) are to be illuminated in a display event. The relation between sequence counter codes and the function word signs is shown in column 1 of Table II. It should be noted that during D1 time in the communicate cycle, the contents of RAM location "0" is placed on the display driving lines (FIGS. 4B and C) in precisely the same manner as the contents of RAM locations 1–4 during the time intervals D2 to D5. In decoding the RAM location 0–4 signals sequence counter states of "1" and "10" control the same function lamp, e.g., the "lbs" lamp, while sequence counter state "15" provides no lamp illumination as indicated in the first column of Table II.

The sequence counter is placed in a count of "1" at block 572 any time the scale is found to be in motion. This assures that the scale will return to the weight display mode following detection of motion. The sequence counter is also set to a count of "1" at block 678 upon detecting chart out of range error, in order that the scale remain in the weight reading and indicating mode and be restrained from entering a subsequent mode until this condition is corrected. The sequence counter is also set to a count of "1" at block 724 in the clear price subroutine, in order that the scale return to the weight display mode in response to closure of the clear key CE detected at block 639. The sequence counter is also set to "1" at block 502 in order that weight mode operation occur following power up.

The sequence counter is placed in a count of "10", which also results in illumination of only the "lbs" function sign, at block 9608 when the scale weight chart is located in the weight dead zone and 171 trips through the communicate cycle have been performed. With the sequence counter in the count of "10", the decision block 8854 allows the scale to enter the price per unit weight display mode.

With the scale in the weight display mode and the weight indicating chart out of the weight dead zone, the sequence counter is placed in the count of "12" to illuminate both the "weight" and "lbs" function lamps 33 and 32 (FIGS. 2 and 4C) as shown at blocks 9607 and 9610, this condition indicating that weight has been placed on the scale platter. The sequence counter is set in a count "13" wherein the function signs "price" and "per lb" are illuminated at block 9658 following entry of the first price per unit weight digit.

The sequence counter is placed in the count "14", the total mode, wherein the function signs "total" and "price" are illuminated at block 9649, once the total price or product has been computed. In each of the above conditions where the sequence counter is set to a new state, it should be noted that a requirement for the setting to this new state is that the counter be already in the next lower state. That is, the sequence counter is always changed from any of the states in column 1 of Table II to the state immediately following, without the possibility of jumping or reversing.

COMMUNICATE TIMING

In the lower portion of FIG. 10 there is shown a timing diagram which describes events occuring during the communication cycle of the present scale. As indicated in the second line of this timing diagram, the information which determines which of the display segments, e, f, g and decimal point (dp) are to be illuminated, appears at the ROM "0" output port some 85 microseconds prior to the D1 timing pulse and is terminated some 40 microseconds following the end of the D1 timing pulse. Segment selection for illuminating is determined by which of the e, f, g and dp signals are present. The possibility of no segments from this group being present is indicated by dotted lines in FIG. 10. After the desired e, f, g and dp segment information has been placed on the ROM "0" output port lines, the D1 pulse commences to initiate current flow in the selected segment. In a similar manner, the data selected for the a, b, c and d segments, i.e., the top, the righthand top side, the rigthand lower side and the bottom of a numeral eight, appears some 40 microseconds ahead of the D1 pulse and terminates some 85 microseconds after the D1 pulse, the current flow time again being defined by the D1 pulse.

In the lowest line of the FIG. 10 timing chart, the location and duration of the information sampling strobe pulses within D time intervals is defined, the locations of these timing pulses in the lower portion of FIG. 10 can, of course, be determined from the input-/output communication information contained in the *Intel User's Manual.*

ALTERNATE EMBODIMENTS

In the preferred embodiment of the scale, the display remains in the total price display mode permanently once a proper total key entry has been made (i.e., permanently until operator intervention). It is, of course, possible to modify this such that the scale, while in the total price mode, repeats the display sequence of weight/price per pound/total price continuously, in order that the scale user has repeated access to each of the numbers relating to the article being weighed. A modification to the communicate cycle flow diagram of FIG. 5, which accomplishes this repeated cycling through the weight/price per pound/total price display sequence while in the total price mode, is shown in FIG. 9. The blocks 567 to 575 represent the motion testing sequence block of 567 to 575 in FIG. 5B, with the exception that the block 572 has been omitted, this block being inserted as the last step in the modified form of the blank display subroutine shown at 700 to 710 in FIG. 9.

Moving block 572 from its normal position in FIG. 5 to a location in the blank display subroutine has the effect of returning the sequence counter in Table II to the count of "1" (the weight display mode) each time the display blank subroutine block 700 to 710 is utilized in the program. The use of the blank display subroutine which is effective to return the scale to the desired weight display mode occurs at block 594 in FIG. 5, where the display blank subroutine is employed for flashing the total price display. With the modified form of the display blank subroutine, shown at 700 to 710 in FIG. 9, after the total price has been displayed for one update count, the sequence counter will be returned to the count of "1" and the information stored in the net weight, price per unit weight, the total price RAM memory locations accessed in turn during different routes between blocks 802 and 840 in FIG. 8, which occur in response to route modifying decisions.

It should be noted that removing the addressing and setting of the sequence counter to a count of "1", indicated at block 572, to the alternate position at 975 in the modified display subroutine of FIG. 9, has no effect on the FIG. 5 motion test sequence of blocks 567-575, since the blank display subroutine is accessed at block 574 and the desired setting of the sequence counter to a "1" is therein performed.

Another alternate arrangement of the present scale achieves operation wherein removal of an article from the scale platter causes the display 20 to return permanently to the weight indicating mode, remaining in this mode until the operator makes a new price per unit weight entry.

Permanent residing in the weight display mode following platter clearing can be achieved as illustrated by the blocks 567 to 973 in FIG. 9, these blocks being a modified version of the motion testing sequence of block 567-575 in FIG. 5. In the motion testing sequence of FIG. 9, the block 973 has been added in order that a jump to the clear price memory subroutine occur in response to detecting motion during a communicate cycle operation. As indicated by blocks 724-731 in FIG. 7A the clear price subroutine includes setting the sequence counter to a count of "1", block 724, accessing and zeroing each digit of the price per unit weight memory, block 725-728, clearing the price entry and total key status blocks 729 and 730, and return to the communicate cycle operation. In this sequence returning the sequencing counter to the count of "1" provides the scale with ability to remain in the price per unit weight mode until a new price per unit weight entry is made by the operator.

SUBROUTINES

In connection with the alternate embodiments described above the blank display and clear price subroutines were described. FIG. 7 shows the subroutines employed for (1) performing addition during the total value computation sequence of blocks 9637-9642 in FIG. 6; (2) transferring data between RAM memory locations as performed in the left shifting of price per unit weight digits at RAM locations 11-15 in FIG. 11; (3) rounding to increment and drop digits from the total price product before transfer to the display memory at RAM locations 1-4; and (4) code converting to change the gray code used on the scale weight chart to binary coded decimal form.

The "add" subroutine shown at blocks 711-722 in FIG. 7 performs the addition of two digits in the CPU accumulator, block 712 and 714, decimal adjusts the accumulator, block 715, transfers the accumulated sum to memory, and then increments addresses to access higher order digits, block 719 and transfers the generated carry bit to the accumulator and then to the sum blocks 720 and 721. The decimal adjust step of block 715 is performed by the DAA instructions at line 7340 in Table I. This instruction performs the function of changing the BCD acccumulator numbers to decimal weighted numbers as explained in the *Intel User's Manual*.

The transfer data subroutine of block 732-739 reads the first digit of data from its original location into the CPU accumulator block 732, then writes the accumulator data into the designated new memory address block 735, and increments both new and old address block 737 until the test of block 738 indicates the desired transfer to be complete.

The round subroutine of blocks 755-760 in FIG. 7B includes loading a rounding constant of value of 5 into the accumulator block 755; this constant is added to the number being rounded to determine if it has a value of 5 or more; performing the addition, block 757, decimal adjusting the accumulator contents, block 758 using the DAA instruction at line 7540 in Table I, loading the rounded digits in memory, block 759, testing for the presence of a carry bit indicating next higher number incrementing is to be performed, and adding the carry bit to the accumulator contents for the purpose of incrementing the next higher digit. The next higher digit is at block 762, for the next following trip through the blocks 757-760 sequence. Return to the compute cycle sequence is indicated at block 761.

The code conversion subroutine of block 740-752 in FIG. 7B operates by designating a memory location for receiving the most significant digit of weight information, block 740, collecting the first gray code digit of weight information to the cleared accumulator, blocks 741 and 742, testing for the previous weight digit being odd or even, block 744, storing the grade code digit in memory, block 747 and converting the gray code digit to binary coded decimal form, blocks 748. The conversion indicated at block 748 is performed with the conversion table at line 7950 in Table I.

The converted gray code digit is written in binary coded decimal form in memory, and if found to be odd, a carry bit is loaded into the CPU accumulator at block 750 for use in making the test of block 744 during the next following trip through the code convert sequence. The memory addresses for both the gray code and BCD converted numbers are decremented at block 751 for the next trip through the block 740-752 sequence. It should be noted that decrementing of the memory addresses is required since the code conversion sequence is performed first on the highest ordered digits. The test of block 752 is used to access successively lower order digits in the weight indicating gray code word.

While the forms of apparatus herein described constitute preferred embodiments of this invention, it is to be understood that the invention is not limited to these precise forms of apparatus, and that changes may be made therein without departing from the scope of the invention.

What is claimed is:

1. In a weighing scale for computing the total value of an article being weighed from a weight input and a price per unit weight input, said scale having
   an article receiving platter,
   a weighing system including a weight responsive mechanism connected to said platter and including an electrical weight signal output means,
   sensing means responsive to changing weight,
   computing means operatively connected to said weighing mechanism for receiving the weight output signal,
   means for providing a price per unit weight signal to said computing means for computing total value from the weight and price per unit weight signals, and
   digital numerical display means for visually displaying numbers identifying the weight, the price per unit weight, and the total price of a given article on the platter upon entry of price per unit weight and computation of the weight times the price per unit weight;

the improvement comprising said numerical display means including one multidigit number display connected to show sequentially at least two of said numbers and selectively operable indicator means identifying the number shown on said one display, and sequencer means returning said one display to the beginning of its sequence in response to a change in weight after having once become stabilized and causing the sequence to repeat as far as it progressed prior to such change.

2. A weighing scale as defined in claim 1, wherein said one display is connected to show numbers sequentially indicating
 a. weight of an article placed on the scale,
 b. the price per unit weight,
 c. the total price of the article,
and said sequencer means returns said one display to a weight indication upon change in weight signal without returning to zero weight and without removing the entire article, and then advances said one display to the condition it obtained prior to such change in weight signal.

3. A weighing scale as defined in claim 2, wherein said sequencer means provides a minimum display time for number indicating weight and price per unit weight upon sequencing after detection of change in weight signal.

4. A weighing scale as defined in claim 2, including means for providing a tare signal,
 means responsive to the weight signal being less than a predetermined minimum for enabling entry of a tare signal into said computing means,
 means transmitting said tare signal to said display means prior to display of weight of an article, and
 means indicating that the number displayed is a tare entry.

5. A weighing scale as defined in claim 4, wherein said computing means subtracts the entered tare signal from said weight signal and provides a difference output signal to drive said display means, and
 said sequencer means is arranged to begin the display sequence with a number corresponding to said difference signal.

6. A weighing scale as defined in claim 1, wherein said means providing price per unit weight is a keyboard by which price per unit weight is entered one digit at a time.

7. In a weighing scale for computing the total price of an article being weighed from a weight input and a price per unit weight input,
 a weighing system including a weight responsive mechanism weighing an article receiving platter and an electrical weight signal output means,
 common numerical display means for visually displaying first the weight and subsequently the total price of a given article on the scale upon computation of the article's weight times the price per unit weight,
 computing means operatively connected to said weighing mechanism for receiving a weight output signal,
 means for providing a price per unit weight signal to said computing means for computing total price from the weight and price per unit weight signals,
 memory means for storing data pertaining to said price per unit weight signal,
 means for sensing change in weight on the platter,
 means operatively connected to said weight change sensing means for returning the common display means to weight display mode in response to change of weight of the article thereon after said display means has progressed beyond display of weight,
 said computing means being operative thereafter to recompute the total price by multiplying the new weight signal by the stored price per unit weight data, and
 means for reinitiating sequential display of said weight and price on said common display means.

8. A weighing scale according to claim 7, wherein said reinitiating means is automatically operable whenever a price per unit weight signal has been stored in said memory means, and said scale further includes time delay means for temporarily retaining display of the price per unit weight prior to display of a new total price.

9. A weighing scale according to claim 7 wherein said common display means displays both said weight and price per unit weight in sequence followed by display of the total price of the article on the platter.

10. A weighing scale according to claim 9 including means for clearing said memory means of price per unit weight data and reinstating display of weight in response to such clearing.

11. A weighing scale according to claim 7 further including means for providing a tare signal to said computing means and for displaying a number corresponding to said tare signal while said platter is empty,
 said computing means providing a weight minus tare difference signal used to display weight of an article on said platter, and
 said difference signal being used by said computing means to compute total price.

12. A weighing scale according to claim 7 wherein said means for providing a price per unit weight signal comprises a common keyboard for entering both tare and price per unit weight signals therefrom, and means responsive to the existence or non-existence of an article on said platter to cause said keyboard to provide either a tare weight signal to display tare when the platter is empty or a price per unit weight signal to display price per unit weight when an article is on the platter.

13. A weighing scale according to claim 12 including memory means for storing the tare signal until a weighing and pricing transaction has been completed whether or not the article is removed from the platter, and
 means for erasing said tare signal from said memory means when said platter is emptied following a completed transaction.

14. In a weighing scale having price computing capability, including a platter, means for generating code information corresponding to weight of a commodity on said platter and also a signal indicating no effective weight on said platter,
 display means operable to display price related information sequentially,
 detecting means operable to sense change of weight on said platter and to develop a corresponding signal, a keyboard for generating code information corresponding to price per unit weight, a microprocessor having inputs connected to accept said weight code information and said price per unit weight information and a signal from said detecting means and also having an output connected to drive said display means, separately actuatable indicators incorporated in said display means and operable to indicate whether a number displayed corresponds to weight or price per unit weight or total price, control means incorporated in said microprocessor for repeatedly interrogating said means for generating weight code information and for actuating said weight display indicator thereby causing said display means to display numerical weight information when said detecting means indicates weight change has stopped with weight on said platter, keyboard operation causing said microprocessor to accept price per unit weight information entered on said keyboard and to cause display of said price per unit weight instead of weight information and to actuate said price per unit weight indicator, means for actuating said microprocessor to multiply the weight information by the entered price per unit weight and to switch said display means to display the resultant product as total price, the improvement comprising sequencing means responsive to a signal from said detecting means together with an indication of weight remaining on said platter and without an intervening no weight signal to reset said display unit to display weight and also to display in sequence any entered price per unit weight and the total price corresponding to the displayed weight times entered price per unit weight.

15. A weighing scale having price computing capability comprising a platter, means for generating code information corresponding to weight of a commodity on said platter, means detecting a no weight condition of said platter and developing a corresponding signal, a manually operable keyboard including means for generating code information in response to manual actuation of said keyboard, a tare register, a price per unit weight register, and means responsive to said keyboard code information generating means and to said no weight detecting means and operable to cause transfer of keyboard entered information into said tare register when no weight is on said platter and to cause transfer of keyboard entered information into said price per unit weight register when there is weight on said platter.

16. A weighing scale as defined in claim 15, including a clear key on said keyboard, and circuit means responsive to actuation of said clear key and a no weight signal to clear said tare register.

17. A weighing scale as defined in claim 16, including circuit means responsive to actuation of said clear key while weight is on said platter and operable to clear said price per unit weight register.

18. A weighing scale having price computing capability comprising a platter, means for generating code information corresponding to weight of a commodity on said platter, means detecting a no weight condition of said platter and developing a corresponding signal, a manually operable keyboard including means for generating code information in response to manual actuation of said keyboard, a tare register, a price per unit weight register, means responsive to said keyboard code information generating means and to said no weight detecting means and operable to cause transfer of keyboard entered information into said tare register when no weight is on said platter and to cause transfer of keyboard entered information into said price per unit weight register when there is weight on said platter, means for subtracting tare register information from weight information and for producing a difference signal, means for multiplying registered price per unit weight information by said difference signal information to produce total price information, a display including a multi-digit numerical indicator, and control circuit means driving said display to show numbers corresponding to tare, weight, price per unit weight and total price.

19. A weighing scale as defined in claim 18, including a clear key, and means responsive to actuation of said clear key after total price has been displayed to retain an entry in said tare register for a weighing/computing operation on another article later placed on said platter.

20. A weighing scale as defined in claim 18, including means for clearing said tare weight register after the total price is displayed and a no weight signal indicates the article has been removed from said platter.

21. In a weighing scale having price computing capability including a platter, means for generating input code information corresponding to weight of an article on said platter, a multi-digit display unit operable to display weight, unit price and total price information in numeric form according to corresponding output signals, a keyboard for generating input code information corresponding to unit price in response to manual actuation of said keyboard;

the improvement comprising a microcomputer including circuit connections providing limited input-output communication for input and output signals, said microcomputer also including means for multiplying said input code information to generate an output signal corresponding to total price, said microcomputer incorporating program circuit means constructed and arranged to interrogate sequentially said weight code generating means and said keyboard by means of said circuit connections, to convert said weight and keyboard input signals into corresponding output signals, and to drive said display unit directly from said output signals in time with the interrogation of said code information, said program circuit means repeating said interrogation and display drive functions rapidly in predetermined sequence.

22. A weighing scale as defined in claim 21, wherein said display unit incorporates number displays having an illumination capability related to the duration of a driving signal applied thereto, and said program circuit means repeatedly drives said display unit at a frequency sufficient to cause apparent continuous display of a number to an observer.

23. A weighing scale as defined in claim 22, wherein said program circuit means drives each digit display of said display unit in sequence whereby the digit display share the drive function of said program circuit means in multiplex fashion.

24. A weighing scale as defined in claim 22, wherein said display unit is driven to display and identify on the same multi-digit display a sequence of numbers representing weight of an article, price per unit weight, and total price of the article.

25. A weighing scale having price computing capability including a platter, means for generating input code information corresponding to weight of a commodity on said platter, a multi-digit display unit operable to display output information in alpha-numeric form, means operable to sense motion of said platter and to develop a corresponding input signal, a keyboard for generating input code information in response to manual actuation of said keyboard, a computer associated with said scale including a central processing unit (CPU) and a random access memory (RAM) and a read only memory (ROM), said ROM having means defining a sequence of operations in response to predetermined input information from said keyboard, said motion sensing means and said weight code generating means, said sequence including a. storage of weight code information in said RAM, b. storage of keyboard input information in said RAM identifying the price per unit weight of the commodity, c. multiplying the stored weight code information by the stored price per unit weight and storing the result in said RAM as total price, circuit means providing a data transfer path of limited capacity into and out of said ROM including input-/output ports through which said RAM can be accessed respectively to said display unit, said keyboard, said weight code generating means, and said motion sensing means, and said ROM including means establishing a predetermined usage of said circuit means to direct data transfer between said RAM and said display unit sufficient to assure apparently continuous visible illumination of said display unit in ambient light.

26. A weighing scale as defined in claim 25 wherein said display unit incorporates numeric light emitting diode (LED) units for numeral display, and said usage determining means in said ROM is arranged to drive said LED units directly from said computer at a repetition rate sufficient to form displayed numerals in apparently continuous fashion.

27. A weighing scale as defined in claim 25, wherein said display unit includes a plurality of variable number displays for showing multi-digit numbers, said circuit means being connected sequentially to drive said variable displays in rapid fashion for apparent continuous display of numbers.

28. A weighing scale as defined in claim 25, wherein at least some of said display unit is utilized at different times in a weighing/computing operation to display different numbers corresponding to weight of an article, its price per unit weight, and its total price.

29. In a scale for computing value from variable weight and price per unit weight information, including a weight signal generator, manual input apparatus for receiving operator supplied information such as price per unit weight and function commands, and electrically operated display means for indicating one or more value related quantities, the improvement comprising, computer means including data storage memory and program circuit means generating a first repeating sequence of events wherein communicating with said weight signal generator, manual input apparatus and said display means occurs, and also generating a second sequence of events for processing information received during one or more first sequence operations and;

said computer means automatically initiating a second sequence operation periodically.

30. The scale of claim 29 including independently operable means for initiating second sequence operation in response to receipt of predetermined information into said computer means during first sequence operation.

31. The scale of claim 29 including, means for aborting second sequence operation prior to completion thereof and returning to first sequence operation in response to abnormalities in input information from said weight signal generator and/or said manual input apparatus.

32. The scale of claim 29 wherein repetition of said first sequence is terminated prematurely and second sequence operation is commenced upon detecting entry of information from said manual input apparatus during first sequence operation.

33. The scale of claim 29 wherein said display means is driven from said computer means in real time by events in said first sequence, said display means remaining in off condition during second sequence events.

34. The scale of claim 33 wherein said display means includes a plurality of number-digit display elements, said elements being driven in multiplexed sequence one element on and the remaining elements off during any display time.

35. The scale of claim 33 wherein said display means includes a plurality of number-digit display elements used in common to indicate at different times numbers corresponding to weight, price per unit weight, and total price of an article being weighed.

36. The scale of claim 35 wherein said display means further includes a plurality of number identifying display elements driven from said computer means at said different times to identify the nature of the number or display.

37. The scale of claim 36, said number digit elements and said number identifying elements being driven from said computer means in multiplexed sequence only during first sequence events with one element on and the remaining elements off at any display time.

38. A weighing and computing scale as defined in claim 29, wherein said computer means includes control means determining the operating sequence of said computer means and causing the performance of total value computation after price per unit weight display indication and prior to said total value display indication.

39. The apparatus of claim 38 wherein said display means is driven from said computer means without data storage external thereof, said computer means being sequentially timeshared between computing and display driving events with computing events located sequentially intermediate displaying events to cause computation at data change time and without display flicker.

40. In a scale for computing weight and value and including a weight signal generator providing a weight signal corresponding to weight of an article, a keyboard providing at least a price per unit weight signal, and a numerical display; the improvement comprising, computer means for computing price and/or weight related information and for storing communicated information;

program circuit means constructed and arranged to direct said computer means through separate communicate and compute routines, said communicate routine including means for continuously and repeatedly communicating between said weight signal generator, keyboard and display and said computer means storage in a first sequence repeated plural times within human response intervals of visual resolution and digital motion, and means for interrupting said continuing communicate routine and initiating a compute routine at intervals sufficiently separated for human comprehension of newly computed and displayed information.

41. The scale of claim 40, including means for interrupting said communicate routine and initiating a compute routine upon receipt of new weight signal information and/or new keyboard signal information.

42. The scale of claim 40 wherein said communicate routine is repeated at intervals less than thirty milliseconds.

43. The scale of claim 40 wherein said communicate routine is repeated at time intervals asynchronous with the alternating current energy supplied to said scale to preclude display flicker from power supply waveform ripple.

44. The scale of claim 40 wherein communication with said weight signal generator, said keyboard and said display occurs in real time without data storage externally of said computer means.

45. The scale of claim 40 wherein said display is a single multi-digit number together with selectively operable number identifying signs, said number digits and said identifying signs being driven in real time multiplex.

46. The scale of claim 40 wherein said computer means is controlled by said program means to communicate simultaneously with at least two of said weight signal generator, said keyboard, and said display.

47. The scale of claim 46 wherein said computer means simultaneously communicates with said weight signal generator and said display.

48. The scale of claim 40 further including means for interpreting information communicated from said keyboard in the absence of a load on said scale as tare weight information and in the presence of a load on said scale as price per unit weight information.

49. The scale of claim 48 wherein said computer means is controlled by said program means to compute article weight from said tare information and information from said weight signal generator and to compute total price from said article weight information and said price per unit weight information.

50. In a weighing scale having price computing capability and including a platter, means for generating input code information corresponding to weight of an article on said platter, a multi-digit single member display unit operable to display sequentially numbers corresponding to weight, unit price and total price information according to corresponding output signals, a keyboard for generating input code information corresponding to unit price is response to manual actuation of said keyboard;

the improvement comprising a microcomputer including circuit connections providing communication for input and output signals, said microcomputer also including means for multiplying selected portions of said input code information to generate an output signal corresponding to total price, said microcomputer incorporating program circuit means constructed and arranged to interrogate said weight code generating means and said keyboard by means of said circuit connections, to convert said weight and keyboard input signals into corresponding output signals, and to drive said display unit directly from said output signals in multiplexed digit by digit fashion for each sequentially displayed multi-digit weight, unit price, and total price number.

* * * * *

UNITED STATES PATENT AND TRADEMARK OFFICE
CERTIFICATE OF CORRECTION

PATENT NO. : 4,055,753
DATED : October 25, 1977
INVENTOR(S) : Robert M. Rogers and Edwin E. Boshinski It is certified that error appears in the above-identified patent and that said Letters Patent are hereby corrected as shown below:

Column 1, line 9, insert Comma (,) after "Boshinski".
Column 2, line 11, "quality" should be --quantity--.
Column 4, line 44, "nd" should be --and--.
Column 13, line 6, "cler" should be --clear--; line 17, insert "and" after "cycle"; line 35, change the "," to a --.--.
Column 15, line 56, "is" should be --in--.
Column 19, line 7, insert --being-- after "these"; line 21, change "608oc611" to 608-611--; line 24, "608 oc 611" should be --608-611--.
Column 20, line 13, change "If" to --It--.
Column 21, line 16, "not" should --nor--.
Column 22, line 47, "block" should be --blocks--.
Column 24, line 11, change " " to --"1"--.
Column 25, line 40, insert "38" after "price".
Column 29, line 6, "From" should begin a new line.
Column 30, line 22, correct the spelling of "blocks".
Column 34, line 27, change "grade" to --gray--; line 44, pages 76 through 92 of application have been omitted from patent; however, the complete program listing appears in copending application Serial No. 641,140, filed December 15, 1975, now U. S. Patent No. 4,055,748, issued October 25, 1977.

Signed and Sealed this

Fourth Day of July 1978

[SEAL]

Attest:

RUTH C. MASON
Attesting Officer

DONALD W. BANNER
Commissioner of Patents and Trademarks